(12) United States Patent
Rouhani-Kalleh

(10) Patent No.: US 10,713,320 B2
(45) Date of Patent: Jul. 14, 2020

(54) DE-DUPING EVENTS ON ONLINE SOCIAL NETWORKS

(71) Applicant: Facebook, Inc., Menlo Park, CA (US)

(72) Inventor: Omid Rouhani-Kalleh, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 303 days.

(21) Appl. No.: 15/847,818

(22) Filed: Dec. 19, 2017

(65) Prior Publication Data
US 2019/0108263 A1 Apr. 11, 2019

Related U.S. Application Data

(60) Provisional application No. 62/569,982, filed on Oct. 9, 2017.

(51) Int. Cl.
*G06F 16/9535* (2019.01)
*G06F 16/28* (2019.01)
(Continued)

(52) U.S. Cl.
CPC ............ *G06F 16/9535* (2019.01); *G06F 7/24* (2013.01); *G06F 16/248* (2019.01);
(Continued)

(58) Field of Classification Search
CPC .. G06F 16/951; G06F 16/285; G06F 16/9535; G06F 16/24578; G06F 16/248; G06F 16/313; G06F 16/3338; G06F 16/353; G06F 16/36; G06F 16/367; G06F 7/24; G06F 16/34; G06F 16/38; G06F 11/00; G06F 16/22; G06F 16/24565; G06F 16/2477; G06F 16/334; G06F 16/338; G06F 16/355; G06F 16/358; G06F 16/9038; G06F 16/93; G06F 17/2211; G06F 17/245; G06F 17/278; G06F 3/0482; G06F 3/14;
(Continued)

(56) References Cited

U.S. PATENT DOCUMENTS 8,671,001 B1* 3/2014 Thompson ............. G06Q 50/10
705/5
2004/0006652 A1* 1/2004 Prall ....................... G06F 9/542
719/318

(Continued)

OTHER PUBLICATIONS

U.S. Appl. No. 15/615,713, filed Jun. 6, 2017, Jaech.

(Continued)

*Primary Examiner* — Shyue Jiunn Hwa
(74) *Attorney, Agent, or Firm* — Baker Botts L.L.P.

(57) ABSTRACT

In one embodiment, a method may include, by one or more computing systems of an online social network, receiving a first event listing corresponding to a first event, placing the first event listing in a first bucket of an array based on a time of the first event, identifying one or more second event listings having a time placing them in the first bucket of the array or one of the buckets of the array adjacent to the first bucket, computing, for each of the second event listings, a similarity score between the first event listing and the second event listing, and updating each second event listing having a similarity score greater than a threshold score to include redirection information to the first event listing.

19 Claims, 17 Drawing Sheets

(51) Int. Cl.
*G06N 20/00* (2019.01)
*G06F 16/2457* (2019.01)
*G06F 16/248* (2019.01)
*G06F 7/24* (2006.01)
*G06F 16/951* (2019.01)
*G06Q 50/00* (2012.01)
*H04L 12/58* (2006.01)
*H04L 29/08* (2006.01)

(52) U.S. Cl.
CPC ...... *G06F 16/24578* (2019.01); *G06F 16/285* (2019.01); *G06F 16/951* (2019.01); *G06N 20/00* (2019.01); *G06Q 50/01* (2013.01); *H04L 51/24* (2013.01); *H04L 51/32* (2013.01); *H04L 67/20* (2013.01)

(58) Field of Classification Search
CPC ........... G06F 16/2455; G06F 16/24575; G06F 3/012; G06F 3/013; G06F 16/2379; G06F 2216/11; G06F 16/2471; G06F 16/29; G06F 16/3329; G06F 16/35; G06F 16/9537; G06F 3/04842; G06F 16/211; G06F 16/215; G06F 16/56; G06F 16/583; G06F 3/017; G06F 3/0304; G06F 3/0346; G06F 3/03545; G06F 3/0426; G06F 3/04815; G06F 3/04847; G06F 3/0486

See application file for complete search history.

(56) References Cited

U.S. PATENT DOCUMENTS

| | | |
|---|---|---|
| 2017/0132226 A1 | 5/2017 | Kalis |
| 2017/0199927 A1 | 7/2017 | Moore |
| 2017/0235820 A1* | 8/2017 | Conrad ................ G06F 16/358 707/728 |
| 2017/0286038 A1* | 10/2017 | Li ............................ G06F 3/14 |

OTHER PUBLICATIONS

U.S. Appl. No. 15/728,189, filed Oct. 9, 2017, Zeng.
U.S. Appl. No. 15/847,799, filed Dec. 19, 2017, Wang.
U.S. Appl. No. 15/847,832, filed Dec. 19, 2017, Koolwal.

* cited by examiner

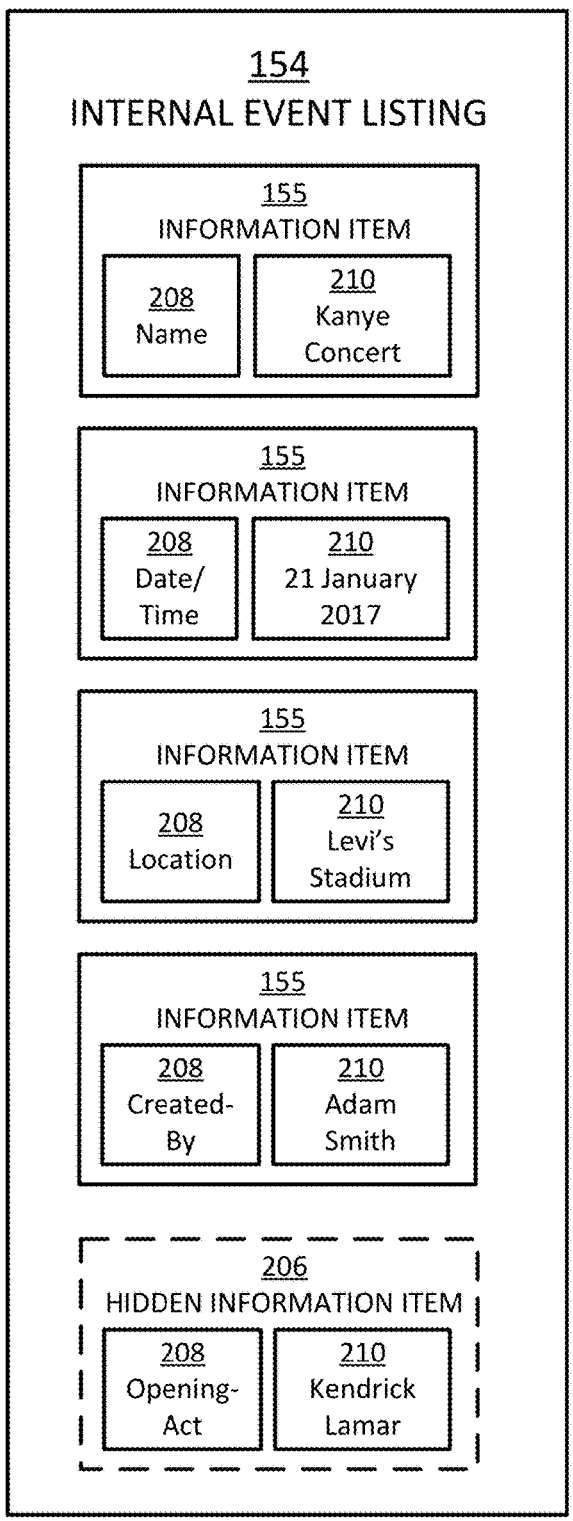
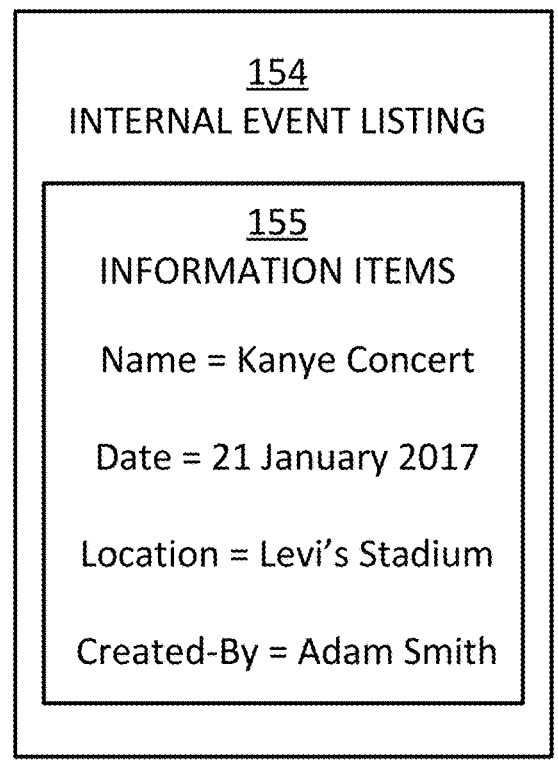
*FIG. 2B*
*FIG. 2A*

880

| 866 TIME / 864 MAP TILE | 852 6 OCT 17 | 854 7 OCT 17 | 856 8 OCT 17 | 858 9 OCT 17 | 860 10 OCT 17 | 862 11 OCT 17 |
|---|---|---|---|---|---|---|
|  |  |  | 822, 826, 830, 834 |  | 838 |  |
| 802 822 |  |  | 882a 822 |  |  |  |
| 804 826 |  |  | 882b 826 |  |  |  |
| 806 |  |  |  |  |  |  |
| 808 |  |  |  |  |  |  |
| 810 830, 834 |  |  | 882c 830, 834 |  |  |  |
| 812 |  |  |  |  |  |  |
| 814 |  |  |  |  |  |  |
| 816 |  |  |  |  |  |  |
| 818 838 |  |  |  |  | 882d 838 |  |

*FIG. 8C*

DE-DUPING EVENTS ON ONLINE SOCIAL NETWORKS

PRIORITY

This application claims the benefit, under 35 U.S.C. § 119(e), of U.S. Provisional Patent Application No. 62/569,982, filed 9 Oct. 2017, which is incorporated herein by reference.

TECHNICAL FIELD

This disclosure generally relates to processing event listings on online social networks.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a social-networking system may receive external event listings from external sources, such as a third-party system, a web browser of a client system, a web server, or other suitable data sources. Each of the external event listings may describe a corresponding real-world event, and may include information such as an event name, date, location, or the like. In particular embodiments, the social-networking system may create, retrieve, update, and delete internal event listings. The information in the internal event listings may be based on the external event listings. The social-networking system may receive the external event listings and map at least a portion of the information in the external event listings to one or more of the internal event listings. The external event listings may be provided by third-party systems, which may be, for example, ticket sales organizations, performance venues, event aggregators, or the like. The third-party systems may access the event listings hosted by the social-networking system via an API. The API may be publicly-accessible or accessible by the third-party systems. The social-networking system may invoke an event aggregator's API to retrieve the aggregator's and/or partner's event inventory.

In particular embodiments, duplicate event listings representing a single real-world event may be identified and linked together, combined, or otherwise associated with each other to avoid unnecessary duplication and inconsistency. Two event listings may be duplicates if both event listings include one or more of the same information items, though duplicate event listings need not be identical. Duplicate event listings may be created separately, e.g., by different users or at different times. A user who creates a duplicate event listing may be unaware of the existence of an existing event listing, or a user may purposefully create a duplicate event listing having one or more additional information items that are not included in the existing event listing or are to be kept separate from those in the existing event listing. A selected duplicate event listing may be designated as a canonical event listing, and access to each of the other duplicate event listings, such as registering to attend an event or reading/writing event information, may be directed to the canonical event listing unless the access is specifically directed to one of the other (non-canonical) event listings. For example, a user may create a duplicate event listing intentionally to share with friends. Access to that event listing by the user and the user's friends may be directed to the duplicate event listing instead of the canonical event listing.

In particular embodiments, a machine-learning model may be used to automatically categorize event listings on an online social network. Event listings may be associated with categories such as music (jazz, rap), comedy, sports (kickball, ultimate Frisbee), e-sports (League of Legends, HearthStone), and so on. Such event categories may be useful for search and discovery features on online social networks or other user applications, such as specific event-management applications. For example, a user may click or tap on a category name in an events application to view events in that category. Event categories may be related to other event categories, so that related events may be found by searching related categories. The event categories may be arranged in a hierarchy, with the broadest categories at the top of the hierarchy and the narrowest at the bottom. For example, "entertainment" may be a top-level category, "music" may be below entertainment, and "jazz" and "rap" may be below "music." Thus, by automatically categorizing events, the event system may allow users to more easily search for and browse events, and to find events in related categories in the hierarchy.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 2A and 2B illustrate an example internal event listing associated with a user entity of a social-networking system.

FIG. 8C illustrates an example two-dimensional array of map tiles and time increments.

DESCRIPTION OF EXAMPLE EMBODIMENTS

System Overview

Figure 1:
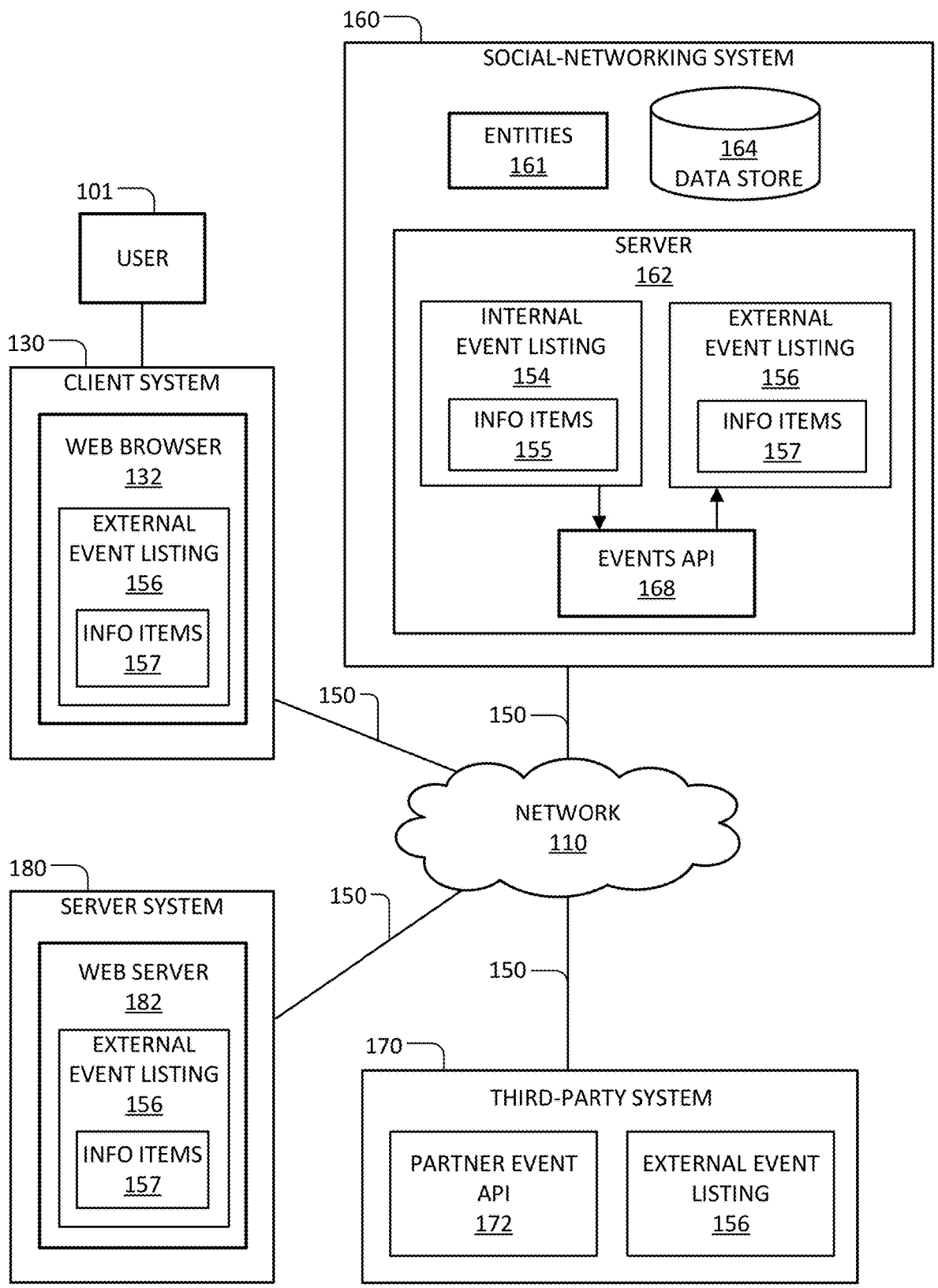
FIG. 1 illustrates an example network environment associated with an event system on an online social network.

FIG. 1 illustrates an example network environment 100 associated with an online social network. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Aggregating Events

In particular embodiments, a social-networking system 160 may receive external event listings 156 from external sources, such as third-party system 170, web browser 132 located on a client system 130, web server 182 located on a server system 180, or other suitable data sources. Each of the external event listings 156 may describe a corresponding real-world event, and may include one or more information items 157, such as an event name, date, location, or the like. In particular embodiments, the social-networking system 160 may create, retrieve, update, and delete internal event listings 154. The information in the internal event listings 154 may be based on the external event listings 156. The social-networking system 160 may receive the external event listings 156 and map at least a portion of the information in the external event listings 156 to one or more of the internal event listings 154. Each internal event listing 154 may correspond to one or more external event listings 156 and may include one or more information items 155, which may be from the corresponding external event listing 156. As an example, an internal event listing 154 may be a copy of or reference to a corresponding external event listing 156 received from an external data source. One or more of the internal information items 155 in each internal event listing 154 may be copies of or references to, or otherwise based on, information items 157 of the corresponding external event listing 156. The internal event listings 154 may be stored in one or more data stores 164 of the social-networking system 160 or other appropriate storage media. Thus, external information items 157 of the external event listings 156 may be received via the network 150 and stored in the data store 164 as internal event listings 154.

In particular embodiments, the third-party systems 170, server system 180, and/or client system 130 may be provided by third parties such as partners, which may be ticket sales organizations, performance venues, event aggregators, or the like. As an example, the third-party systems 170 may access the events hosted by the social-networking system 160 via an API, which may involve a web service invocation via the network 110. The API may be publicly-accessible or accessible by partners of the third party. The partner may be, for example, TICKETMASTER, BANDSINTOWN, or other suitable third-party partners. The partner may host the third-party system 170 and cause internal event listings 154 to be created via a public API by, for example, sending messages containing external event listings 156 to a server 162 associated with the social-networking system 160. The third-party system 170 may maintain external event listings 156 and provide a partner event Application Programming Interface (API) or other suitable communication interface via which the social-networking system 160 may request the external event listings 156. The social-networking system 160 may send the requests to the third-party system 170 via the network 150, and the third-party system 170 may send the requested external event listings 156 back to the social-networking system 160 as responses via the network 110. As another example and not by way of limitation, the social-networking system 160 may invoke an event aggregator's API to retrieve the aggregator's and/or partner's event inventory. The event aggregator's API may provide operations for requesting external event listings 156 similar to those of the partner event API. Example event aggregators include BANDS IN TOWN and BOOK MY SHOW.

In particular embodiments, the social-networking system 160 may receive, from an external event system, one or more external event listings 156 corresponding to one or more events, respectively, wherein each external event listing 156 includes one or more items of event information 157 associated with the respective event. The one or more events may be, for example, real-world events that are scheduled to be held at a particular time and place. The external event system may be, for example, the client system 130 that hosts the web browser 132, the server system 180 that hosts the web server 182, or the third-party system 170 that may host the partner event API 172.

In particular embodiments, the social-networking system 160 may receive external event listings 156 from a user 101 of the social-networking system 160 via a web browser 132 hosted by a client system 130. For example, the user 101 may enter information items 157, such as an event name, date, and location in the web browser 132 or other application executing on the client system 130. An external event listing 156 may be created on the client system 130 from the information items 157 and sent to the events API 168 of the social-networking system 160 via the network 150.

In particular embodiments, the social-networking system 160 may receive external event listings 156 from a web server 182 in the form of web content, e.g., HTML documents, which may be received via the network 150. The external event listings 156 may be in any suitable data format. Each external event listing 156 may include one or more external information items 157. The social-networking system 160 may parse the received external event listings 156 to extract external event information items 157 to be included in internal event listings 154. In particular embodiments, the social-networking system 160 may crawl web servers 182 or perform a web search to identify external event listings 156 that include external information items 157 located on one or more web servers 182 and representing or suitable for use in external event listings 156. The social-networking system 160 may convert such identified external information to a defined data format or structure to form external event listings 156. Alternatively or in addition, the social-networking system may retrieve the external event listings 156, including information items 157 in the format in which the external event listings 156 are stored on their host system. The host system may be, e.g., the third-party system 170, the server system 180, the client system 130, or other system that hosts external events 156. The social-networking system 160 may generate internal event listings 154 based on the external event listings 156, e.g., by copying or parsing the information items 157 of the external event listings 156 from a defined data format or structure, and storing the copied or parsed information items 157 in internal event listings 154 in the data store 164.

In particular embodiments, the network address of the web server 182 (e.g., a URL) from which to retrieve external event listings 156 may be identified using a search engine or by an existing association between the web server 182 and existing event listings. For example, existing internal event listings 154 may include information items 155, such as an artist name, genre, location, date, that can be used to identify particular web sites that may provide information about additional events. In this example, one or more web servers 182 that host content referencing or related to the name of the artist, genre, location, or date of an existing event may be searched for event information. As another example, text in the internal information items 155 in the existing event listings 154 may be used to form search queries in web searches to identify web servers 182 from which additional event information may be retrieved. The social-networking system 160 may retrieve the event information from such web servers 182 and create internal event listings 154 based on the retrieved information. As an example and not by way of limitation, the external event listings 156 may be retrieved from the web server 182 via an appropriate API. As another example and not by way of limitation, such event information may be in HTML or other suitable data format, and may be retrieved from the web server 182 using HTTP or other suitable protocol.

FIGS. 2A and 2B illustrate an example internal event listing 154 associated with a user entity of a social-networking system 160. Although FIGS. 2A and 2B show internal event listings 154, external event listings 156 may be represented similarly. FIG. 2A illustrates the name 208 and value 210 components of the information items 155 of the internal event listing 154. An information item 155 may be represented as a data value. For example, the value "Kanye West" may be an information item 155 in an event listing for a music event. As shown in FIG. 2A, an information item 155 may have an associated name 208. FIG. 2B shows the information items 155 as name-value pairs in the format "name=value." FIGS. 2A and 2B show different representations of four information items 155: an event name item (Name="Kanye Concert"), an event date/time item (Date="21 Jan. 2017"), an event location item, (Location="Levi's Stadium"), and an item identifying the user who created or is responsible for the event listing 154 (Created-By="Adam Smith"). The term "time" as used herein may refer to a time of day, e.g., 5:00 PM, or to a date, e.g., 21 Jan. 2017, or to a data and time, e.g., 21 Jan. 2017 at 5:00 PM, or "today" at 5:00 PM, or "every day" at 5:00 PM, and so on. A point in time may include or be associated with a date, such as 21 Jan. 2017. FIG. 2A shows a first information item 155 having a name-value pair with name="Name" 208 and value="Kanye Concert" 210, a second information item 155 having name="Date" 208 and value="21 Jan. 2017", a third information item 155 having name="Location" 208 and value="Levi's Stadium", and a fourth information item 155 having name="Created-By" 208 and value="Adam Smith" 210.

In particular embodiments, an event listing 154 may include at most one information item 155 having a particular name 208, so storing a different value 210 in an event listing 154 for an information item 155 using the same name 208 may have the effect of replacing the existing value 210. For example, storing the information item 155 Opening-Act="Travis Scott" in an event listing 154 that has an existing information item 155 Opening-Act="Kendrick Lamar" may change the value 210 of the existing Opening-Act item 155 to "Travis Scott." Alternatively, an event listing 154 may include multiple information items 155 having the same name 208, or multiple values 210 for an information item 155 having the same name 208. For example, if multiple information items 155 having the same name are permitted, an internal event listing 154 for an event having two opening acts may include the information items 155 Opening-Act="Kendrick Lamar" and Opening-Act="Travis Scott."

In particular embodiments, the social-networking system 160 may identify, for each of the external event listings 156 received from the external event system, one or more entities 161 of the online social network 160 associated with the external event listing 156. The entities 161 may be online representations of people, businesses, groups, and so on, as described with reference to FIG. 13. Each entity 161 may correspond to an entity node 1304 in a social graph 1300. In particular embodiments, entities 161 may be identified by data in the external event listings 156, such as strings, photos, locations, or other type of data identifying entities.

In particular embodiments, to identify the entities 161, the social-networking system 160 may parse the items of event information 157 of the external event listing 156 to identify one or more name strings, and identify the entities 161 of the online social network 160 that correspond to the name strings. The name strings may be, e.g., names of people, businesses, groups, and so on. As an example and not by way of limitation, an external event listing 156 containing an information item Opening-Act="Kendrick Lamar" may be parsed to extract the string "Kendrick Lamar." The social graph 1300 may then be searched for an entity named "Kendrick Lamar." If an entity node 1304 having that name is found, then that entity node 13404 may be used as an entity 161 associated with the external event listing. In particular embodiments, the name of the information item (e.g., "Opening-Act") may be used to identify a type of edge 1406, and an edge 1406 of the identified type may be created in the social graph 1300 between an entity node 1304 corresponding to the entity (e.g., "Kendrick Lamar") and a entity node 1304 (or other appropriate type of node, such as an event node) corresponding to the event represented by the external event listing 156. Although external event listings 156 are used in examples described herein, entities associated with internal event listings 154 may also be identified. The identified entity may thus provide a link between the event listings 154, 156 and the social-networking system 160.

In particular embodiments, the social-networking system 160 may receive, from a client system 130, content posted to the online social network by a first user 101 of the online social network. The content may reference one of the internal event listings 154. The social-networking system 160 may then send, to one or more client systems 130, one or more notifications based on the referenced internal event listing 154 to one or more second users 101. As an example and not by way of limitation, the second users 101 may be users 101 who are listed as attendees of the event associated with the referenced internal event listing 154. The attendees list may be associated with the internal event listing 154 in the data store 164 or may be represented as user nodes linked to an event node that corresponds to the referenced internal event listing 154 by graph edges, e.g., edges that represent an "attendee" relationship. As another example, the second users may be friends of the first user on the online social network. As still another example, the notifications to the second users may include recommendations for the event associated with the referenced internal event listing. The recommendations may include text recommending that the second user attend the event and a link to or a copy of one or more of the information items 155 associated with the corresponding internal event listing 154.

In particular embodiments, the social-networking system 160 may receive, from the client systems 130, user-submitted corrections to the one of the internal event listings 154. Each user-submitted correction may include an updated item of event information 155. The social-networking system 160 may then update the event listings 154 to include a particular updated item of event information 155 when at least a threshold number of corrections comprising the particular updated item of event information 155 are received. As an example and not by way of limitation, if more than the threshold number of instances of the same correction to an item of event information 155 are received, and each correction is received from a different user, then the corrections may be applied to the item of event information 155. The threshold number may be, e.g., 2, 3, 5, or other appropriate number. An example correction may be changing the location of an event to a new location, e.g., from London to San Francisco. If this particular correction is received for a particular internal event listing 154, then the correction may be applied to the event listing by setting the value of the listing's location information item to "San Francisco."

In particular embodiments, the one or more external event listings may be received from an external event system 170, such as the third-party system 170, the server system 180, or the client system 130, via an events application programming interface (API) 168. As an example and not by way of limitation, the API 168 may include a set of instructions defined at the online social network 160, the set of instructions being executable to enable the external event system to share the external event listings 156 on the online social network 160. In particular embodiments, the API may be a partner API 172 that includes a set of instructions defined at the external event system, the set of instructions being executable to enable the online social network 160 to retrieve external event listings 156 from the external event system. In particular embodiments, the social-networking system 160 may send, to an external event system, a request for the external event listings 156 via the partner event API 172, and the external event listings 156 may be received from the external event system in response to sending the request.

In particular embodiments, the social-networking system 160 may crawl event pages hosted by a web server 182 of the external event system (e.g., the web server 182 on the server system 180) to identify the external event listings 156. As an example and not by way of limitation, crawling the event pages may include searching the content of the event pages hosted by the web server 182, as done by a web search engine. The event pages may be, e.g., web pages that include information related to events, such information items 157. The external event listings 156 may be received by the social-networking system 160 from the external event system in response to crawling the event pages.

In particular embodiments, the social-networking system 160 may determine, for each of the external event listings, whether the external event listing corresponds to an internal event listing on the online social network based on an analysis of the event information associated with the respective external event listing. As an example and not by way of limitation, the social-networking system 160 may compare the information items 157 in the received external event listing 156 to the information items 155 in each internal event listing 154 to determine whether one of the internal event listings 154 is likely to correspond to the same real-world event as the external event listing 156. This determination may be made based on similarities between the information items 155, 157 in the two event listings 154, 156 being compared, e.g., by computing probabilities that the event listings 154, 156 represent the same real-world event, and selecting the internal event listing 154, 156 that has the highest probability and/or satisfies a threshold condition, e.g., that the probability is greater than a threshold value such as 90%, 95%, 99%, or other appropriate value.

Figure 4:
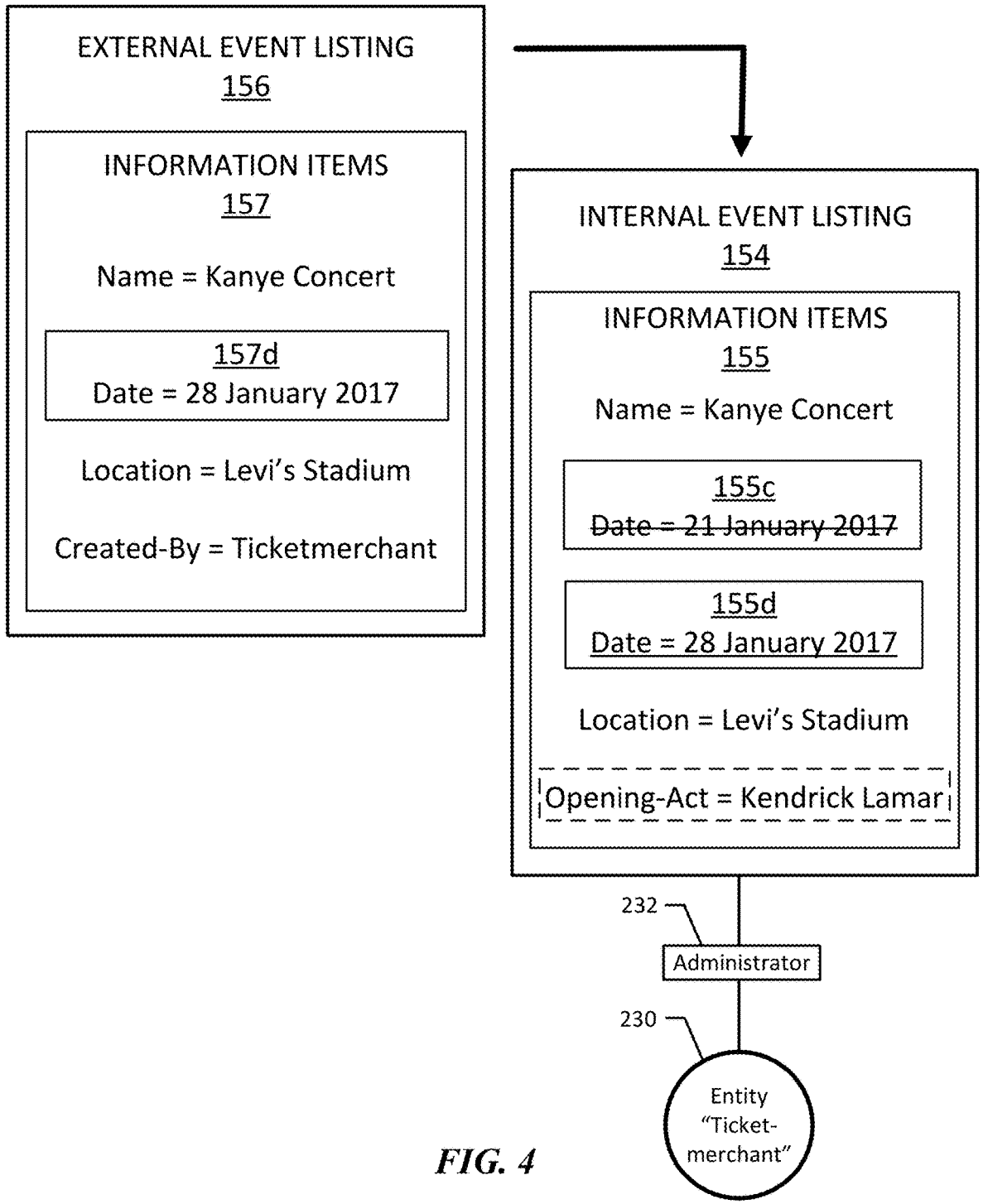
FIG. 4 illustrates an example of updating an internal event listing by changing an existing information item to have a new value from an external event listing.

In particular embodiments, if the social-networking system 160 identifies a "matching" internal event listing 154 that likely represents the same real-world event as the external event listing 156, e.g., is likely a duplicate event listing, then differences between the internal and external event listings, if any, may be resolved. The operations performed to resolve duplicates may depend on the type of source that created the existing internal event listing 154. In particular embodiments, if the existing internal event listing 154 is created by the same source as the new external event listing 156, then the existing internal event listing 154 may be updated as shown in FIG. 4. In particular embodiments, if the existing internal event listing 154 is created by a partner, e.g., BANDSINTOWN or other third-party partners, e.g., through a partner event API, then performer (e.g., artist) information from the new external event listing 156 may be appended to the existing internal event listing 154 as follows. Information items 157 from the external event listing 156 that are not present in the matching internal event listing 154 may be added to the internal event listing 154. Alternatively, a new internal event listing 154 may be created, and may include information items 155 copied from information items 157 of the external event listing 156. The new internal event listing 154 may also include redirection information that identifies the new internal event listing 154 as being in an event cluster with the existing internal event listing 154. The redirection information may also identify a canonical event listing in the event cluster to which the other event listings in the cluster are redirected. Redirection is described further with reference to FIG. 7. In particular embodiments, if the existing internal event listing is created by a user 130, then duplication may not be performed, e.g., the existing internal event listing 154 may not be updated.

In particular embodiments, the social-networking system 160 may, for each of the external event listings 156, if the external event listing 156 corresponds to an internal event listing 154, update the internal event listing 154 to include one or more items of event information 155 based on (e.g., copied from) corresponding items of event information 157 associated with the external event listing 156. The internal event listing 154 may be associated with one or more entities of the social-networking system 160. As an example and not by way of limitation, when the social-networking system 160 receives an external event listing 156 that corresponds to an existing internal event listing 154 with greater than a threshold probability, the existing internal event listing 154 may be updated to include additional information items 155 from the received external event listing 156 that are not present in the existing internal event listing 154. The additional information items 155 may be associated with or stored in the internal event listing 154. For example, one or more of the information items 155 shown in FIG. 2A may have been added to the internal event listing 154 as additional information items subsequent to its creation. In particular embodiments, additional information items 155 may be added to or otherwise associated with the internal event listing 154 as hidden information items 206. Hidden information items 206 may be hidden from (e.g., not visible to) users who do not satisfy certain criteria. For example, hidden information items 206 may ordinarily not be displayed or otherwise presented to users who are not the creator of the hidden information items 206. As another example, hidden information items 206 may be visible to users who are first-degree friends of the user who created them.

In particular embodiments, internal event listings 154 having hidden information items 206 may be identified by event searches that match the hidden information items 206, but the hidden information items 206 are not presented to users. That is, event listings 154 having hidden information items 206 matching a search query may be presented as search results, though the hidden information items 206 are not displayed with the search results and are not otherwise accessible to the user who performed the search. In other embodiments, the hidden information items 206 may be presented to particular users, e.g., to a user who submitted the information that became the hidden information items 206. In still other embodiments, the hidden information items 206 may be shown to users if a condition is satisfied, e.g., if a user specifically requests that hidden information be displayed. The hidden information items 206 may be shown with an indication that the items 206 are potentially unreliable or not applicable to the user viewing them. In particular embodiments, a user who submits information that becomes one or more hidden information items 206 may specify associated permissions, e.g., that the hidden information items 206 are not to be presented to other users, or are only to be presented to the submitting user's friends, for example.

In particular embodiments, a user 101 may request that an internal event listing 154 be created or updated. The user 101 may also specify one or more information items 155 to be included in the internal event listing 154. As an example and not by way of limitation, a user interface provided by a web browser 132 and/or web server 182 may provide a command, e.g., a button or the like, to create an internal event listing 154 using one or more user-specified information items 155. The user interface may receive one or more information items 155 and, optionally, additional information identifying an existing internal event listing 154, such as a name or unique identifier for the existing internal event listing 154. The user interface may send the information items 155 and optional identifying information to the social-networking system 160, e.g., by invoking operations of the events API 168 over the network 110. If an internal event listing 154 corresponding to the specified information items 155 already exists in the social-networking system 160 (e.g., is present in the data store 164), then the user interface may request the social-networking system 160 to update the existing internal event listing 154 to include the user-specified information items 155, and notify the user when the existing event listing 154 has been updated. The user-specified information items 155 may be added to the existing event listing as searchable-only items, as publicly-visible items, or as items having other suitable access restrictions. The user interface may notify the user about the access restrictions associated with the information items 155, if any. The particular access restrictions may be specified by a system administrator or by the user, for example.

In particular embodiments, if a received external event listing 156 does not correspond to an internal event listing 154, then the social-networking system 160 may create a new internal event listing 154 based on the one or more items of event information 157 associated with the external event listing 156. The new internal event listing 154 may be associated with the one or more identified entities 230 associated with the external event listing 156. The user interface may notify the user 101 that the new internal event listing 154 has been created. For example, a user 101 may request that an internal event listing 154 be created with the following two information items: Name="Kanye Concert" and Opening-Act="Kendrick Lamar." The user's request may include at least one "existing" information item 155 having the same value as an information item 155 in existing event listing 154, such as the event name "Kanye Concert." The user's request may also include at least one "new" information item 155 having a value that is not included in the existing event listing 154, such as an opening act name "Kendrick Lamar." As another example, the user may specify an "update" information item 155 having a different value for an existing information item 155 in the existing event listing 154. For example, the date stored in the internal event listing 154 for the "Kanye Concert" event may be changed from 21 Jan. 2017 to 28 Jan. 2017 by a user command, such as an operation performed by the user in a user interface setting the date of the event to 28 Jan. 2017.

Figure 3A:
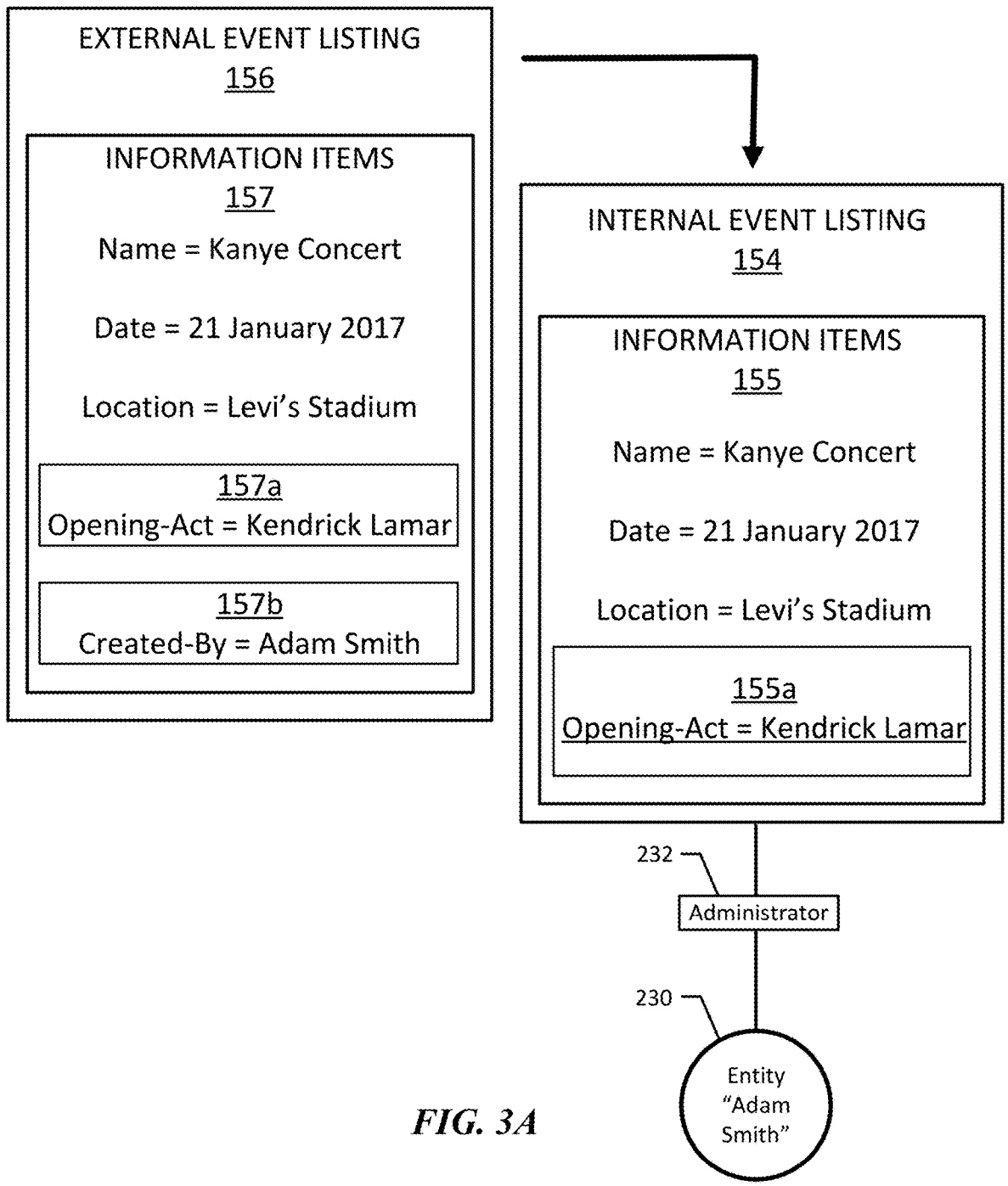
FIG. 3A illustrates an example of updating an internal event listing by adding an information item from an external event listing.

FIG. 3A illustrates an example 300 of updating an internal event listing 154 by adding an information item 155a from an external event listing 156. The external event listing 156 may be received by the server 162 via the events API or other interface to the network 150. The external event listing 156 includes information items 157, including a Name item ("Kanye Concert"), a Date item ("21 Jan. 2017"), a Location item ("Levi's Stadium"), an Opening-Act item 157a ("Kendrick Lamar"), which represents an opening act for the event, and a Created-By item 157b ("Adam Smith"), which represents an entity who created (e.g., performed an action that resulted in creation of) the external event listing 156. Upon receiving the external event listing 156, the social-networking system 160 may determine whether there is an existing internal event listing corresponding to the external event listing 156. In this example, there is an internal event listing 154 that is sufficiently similar to the external event listing 156 to be used as the existing internal event listing. The internal event listing 154 may thus be updated based on information items 157 of the external event listing 156 that are not present in the internal event listing 154. The Opening-Act item 157a and the Created-By item 157b are not present in the internal event listing 154. (The Opening-Act item 155a is underlined to indicate that is not initially present and is being added to the internal event listing 154.) The Opening-Act item 157a is thus added to the internal event listing 154 as an additional Opening-Act information item 155a ("Kendrick Lamar"). The social-networking system 160 may determine whether to make the additional information item 155a a hidden item.

In this example, the determination of whether the additional information item 155a is added as a hidden item may be based on whether the user who created the external event listing 156 is the administrator of the internal event listing 154. If so, the additional information item 155a may be added as an ordinary (non-hidden) item. If not, the additional information item 155a may be added as a hidden item. Since the user who created the external event listing 156 ("Adam Smith") is the administrator of the internal event listing 154 according to the association 232 between the internal event listing 154 and the administrator 230 ("Adam Smith"), the Opening-Act information item 155a ("Kendrick Lamar") may be added as an ordinary (non-hidden) item. The Created-By item 157c is not added to the internal event listing 154 as an information item 155 in this example because the internal event listing 154 was previously created by a different user, whose identity 230 ("Adam Smith") is associated with the internal event listing 154 by the administrator association 232.

Figure 3B:
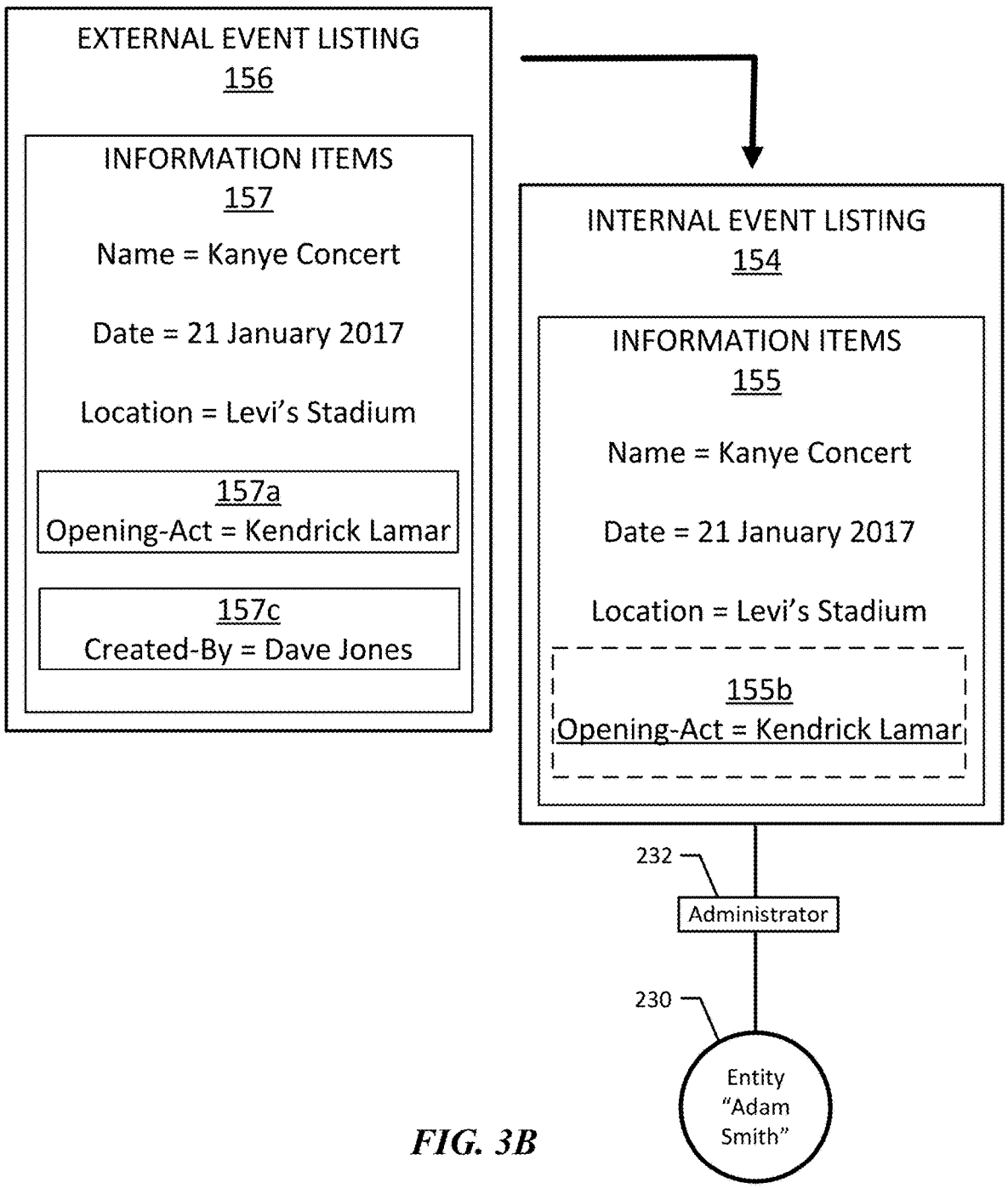
FIG. 3B illustrates an example of updating an internal event listing by adding a hidden information item from an external event listing.

FIG. 3B illustrates an example 310 of updating an internal event listing 154 by adding a hidden information item 155b from an external event listing 156. The example of FIG. 3B is similar to that of FIG. 3A, except the Created-By item 157c ("Dave Jones") indicates that the user who created the external event listing 156 is different from the administrator 230 ("Adam Smith"). Because of this difference, the additional information item 157a (Opening-Act="Kendrick Lamar") is added to the internal event listing 154 as a hidden information item 155b. As described above, hidden information items are not ordinarily presented to users as part of the internal event listing 154, though searches for event listings may access and match the hidden event listing 155b. For example, a search for "Kendrick Lamar" by a searching user who has read access permission for the internal event listing 154 may match the Opening-Act item 155b and return the internal event listing 154. The non-hidden information items (Name="Kanye Concert," Date="21 Jan. 2017," and Location="Levi's Stadium") may be presented to the searching user as part of the internal event listing 154 matching the search, though the hidden information item 155b ("Kendrick Lamar") may not be presented to the searching user unless the searching user's identity satisfies a condition. The condition may be that the searching user is the administrator 230 of the internal event listing 154 or is the user who created the hidden information item 155b (e.g., "Dave Jones" in this example). Thus, the information item 155b (Opening-Act="Kendrick Lamar) may be presented to the user "Adam Smith" or to the user "Dave Jones" as part of the internal event listing 154 when the internal event listing 154 is presented to either of those users, e.g., as a search result or in other situations in which event listings are presented to users.

FIG. 4 illustrates an example 400 of updating an internal event listing by changing an existing information item to have a new value from an external event listing 156. In the example of FIG. 4, an external event listing 156 includes an updated value ("28 Jan. 2017") for the Date information item 157d. Since the existing value for the Date information item 155c in the internal event listing 154 is different ("21 Jan. 2017"), the Date information item 155c in the internal event listing 154 is changed to have the value from the external event listing 156. The updated value is shown as an updated Date information item 155d having the value "28 Jan. 2017" and a deleted information item 155c. In this example, the external event listing 156 has a Created-By item having the same value as the administrator 234 ("Tickmerchant"), so the internal event listing is updated with the new Date value 157d instead of creating a hidden item for the new Date value.

Figure 5:
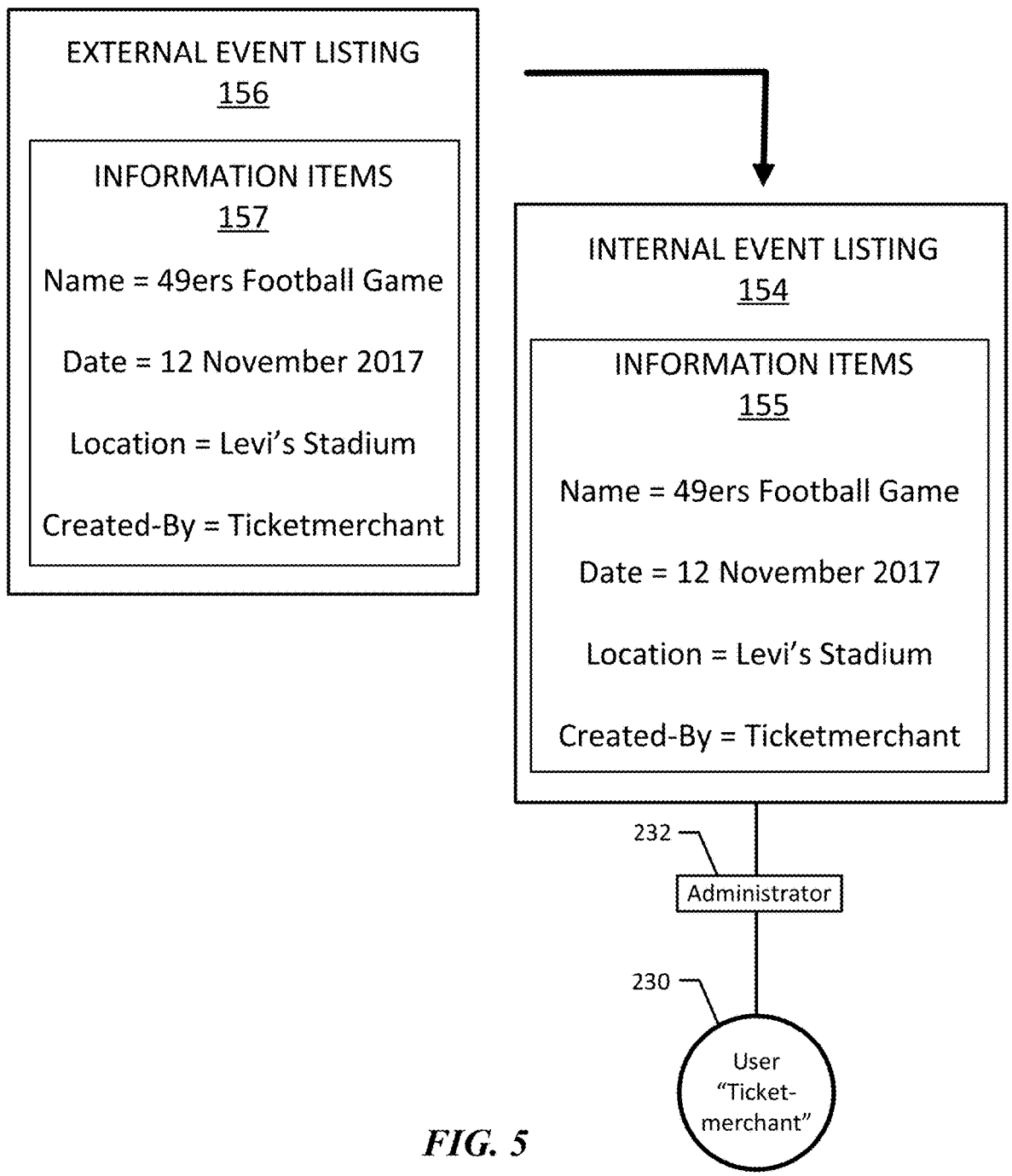
FIG. 5 illustrates an example of creating a new internal event listing from an external event listing.

FIG. 5 illustrates an example 500 of creating a new internal event listing from an external event listing. The external event listing 156 includes information items 157, including a Name item ("49ers Football Game"), a Date item ("12 Nov. 2017"), a Location item ("Levi's Stadium"), and a Created-By item ("Ticketmerchant"), indicating that the external event listing 156 was created by a partner named "Ticketmerchant"). Upon receiving the external event listing 156, the social-networking system 160 may determine whether there is an existing internal event listing corresponding to the external event listing 156. In this example, there is no existing internal event listing 154 sufficiently similar to the external event listing 156. A new internal event listing 154 is therefore created based on the information items 157 in the external event listing 156. In this example, the new internal event listing 154 includes information items 155 that are the same as (e.g., copies of or references to) the information items 157 in the external event listing 156. The user "Ticketmerchant" who created the existing information item 156 is the administrator of the new internal event listing 154, as shown by the administrator association 232 between the internal event listing 154 and the "Ticketmerchant" user 230. As an example and not by way of limitation, the administrator association 232 may be an edge between an event node representing the internal event listing 154 and a user node representing the "Ticketmerchant" user.

In particular embodiments, an existing internal event listing 154 to be updated may be identified explicitly by the user, e.g., by being selected in a user interface or of a web browser 132 or referenced in the user interface by an event identifier that uniquely identifies the existing internal event listing 154 (e.g., "Event-2196"). If the user identifies the internal event listing 154 using a system external to the social-networking system 160, e.g., the client system 130 or the server system 180, then information identifying the user-identified internal event listing 154 may be sent from the external system to the server 162 of the social-networking system 160. The identifying information may be sent as a parameter in an invocation of the events API 168 via the network 110, for example. In particular embodiments, the existing event listing 154 may be identified by the social-networking system 160 using at least one item of event information provided by the user as search criteria (e.g., name="Kanye Concert"). The identified internal event listing 154 may then be updated to include the new information items 155. Optionally, the updated information items 155 may be included in the internal event listing 154 as replacements or additional values for information items 155 having the same name in the internal event listing 154. As an example, the information items 155 that correspond to and are used to identify the existing internal event listing 154 may include, but are not limited to, the event name (e.g., "Kanye Concert" in the above example), venue ("Levi's Stadium"), and/or location ("Santa Clara"), date ("21 Jan. 2017").

In particular embodiments, the event system 161 may determine whether particular information items 155 correspond to an existing internal event listing 154 by calculating a probability based on the information items 155 and the existing internal event listing 154 as described below. If the probability satisfies a threshold condition, such as being greater than a threshold value, a corresponding internal event listing 154 already exists and may be updated to subsequently include the information items.

In particular embodiments, if no existing internal event listing 154 corresponds to the specified information items 155, a new internal event listing 154 that includes the specified information items 155 may be created. For example, the new event listing 154 may include the name of the opening act and any other specified information items 155. Examples of information items 155 that may be associated with existing internal events 154 include ticket URL, artist, ticket provider, and ticket price tags.

In particular embodiments, internal event listings 154 that are automatically-created may be referred to herein as "ingested events" and may be unowned, e.g., not associated with a user 101 or other type of entity, at the time they are created, or may be owned by the online social network. Ingested events may be presented to users by the social-networking system 160 and may be discoverable through discovery interfaces or surfaces, such as an events search results page that lists events identified in response to a search query. Performers who are detected as performing on an event may confirm that they are on (e.g., associated with) the event. In particular embodiments, any page on the social-networking system 160 may add an ingested event to a page. A notification or news feed update referencing or including the event may be sent to users associated with the page, e.g., to fans associated with the page or fans of the performer. Alternatively, unowned internal event listings 154 or internal event listings owned by the online social network may not ordinarily distributed (e.g., presented) to users until an action, such as an intentional action by a user 101 referencing the unowned internal event listings 154, causes them to be distributed to one or more users. As an example, unowned internal event listings 154 may be distributed to users when a user action related to a page associated with the unowned internal event listing 154 occurs. Particular internal unowned event listings 154 may be distributed to users by, e.g., adding the events to the users' feeds.

In particular embodiments, internal event listings 154 may not be presented to users 101 unless an action occurs in the social-networking system 160 that causes a particular internal event listing 154 to be presented to users. In particular embodiments, an internal event listing 154 may be presented to users when one of the following actions occurs: a user adds the internal event listing 154 to a page, such as one of the user's pages, thereby implicitly claiming ownership of the internal event listing 154 and becoming its administrator, or a user 101 specifically searches for the event, e.g., using a search query that matches an information item of the internal event listing 154. A user 101 who claims ownership of an internal event listing 154 may then maintain, promote, and encourage people to engage with the internal event listing 154. That is, the user 101 may become an administrator of the claimed internal event listing 154. Performers who confirm that they are performing on an event may maintain and edit the event on the confirmed event. In particular embodiments, any user may promote an event. Notifications referencing a claimed internal event listing 154 may be generated, e.g., notifications may be sent to the venue and artist associated with the internal event listing 154 requesting that they claim the event.

In particular embodiments, when a user 101 adds an internal event listing 154 to a page, such as one of the user's pages, notifications that refer to or include the internal event listing 154 can then be sent to users 101 who like the page. As another example, if a user performs an action on the internal event listing 154, then a story or notification can be generated. Users who indicate that they "like" the page may see the event in a story. For example, when a venue lists an event on their page, the internal event listing 154 may be distributed via the venue's page to users who view the page. As another example, an "Add to Calendar" action may be displayed on an event page, and the internal event listing 154 may be distributed to users once it is on the user's calendar and visible to other users. In another example, a page owner may access an internal event listing and request that the event show up on their page. Notifications about the internal event listing 154 may then be sent to followers of the owner's page.

In particular embodiments, internal event listings 154 may contain incorrect information. For example, crawling web sites for external event listings 156 may identify an event type and venue, but may identify incorrect values for those information items. Further, when event listings are ingested from a partner, the information from the partner does not ordinarily reference social-networking system pages for entities such as artists and venues. The information from the partner merely includes the names of such entities. The names are matched to the social-networking system page IDs, and there is a possibility that the matching is incorrect. In particular embodiments, information associated with an internal event listing 154 may be corrected by a user 121, the administrator of the internal event listing 154, or another user associated with the internal event listing 154, such as an artist associated with the event listing. If the information is incorrect, the administrator of the page, e.g., the artist, can report the error. The information can be reviewed and corrected manually on the social-networking system 160. If a user has claimed to be the owner of the event, that user may be permitted to edit the information. For events that nobody has claimed, users who view the event may be asked if the information is correct, and if not, to correct the error, e.g., by suggesting corrections. The suggested corrections may be sent to other users through crowdsourcing. Users may then vote on whether the corrections are accurate and should be applied to the internal event listing.

In particular embodiments, one or more items of event information 155 included in the internal event listing 154 associated with the external event listing 156 are may be inaccessible by users of the online social network 160. Such items of event information 155 included in the internal event listing 154 associated with the external event listing 156 may be accessible by one or more search-engine systems and may be referred to herein as hidden information items 155. As an example and not by way of limitation, the items of event information 155 may be accessible as metadata on the web page for the internal event listing 154, e.g., located on the web server 182. As another example, the metadata may be extracted by an external search engine (not shown). Alternatively, the metadata may be metadata associated with the internal event listing 154 that is not on the web page, but instead internally associated with the internal event listing 154 and therefore only accessible to searches of the data store 164 performed by an internal search engine in the social-networking system 160, e.g., by the server 162.

In particular embodiments, the social-networking system 160 may send, to one or more client systems 130, one or more notifications to the one or more identified entities 161 associated with the internal event listings. Each notification may indicate the associated event listing has been updated or created. A client system 130 associated with one of the entities 161 may receive the notifications and present the notifications on an output device. For example, when the location information item 155 of an internal event listing 154 is updated to a new value (e.g., changed from "London" to "San Francisco"), then a notification of the update may be sent to one or more client systems 130 associated with one or more entities 161 that are in turn associated with the internal event listing. A user 101 associated with a client system 130 may be, e.g., a user who is logged into the client system 130, a user who is or has recently been using or carrying the client system 130, or a user 101 who most recently used the device 130. A user 101 associated with an internal event listing 154 may be, e.g., a user 101 who is registered to attend the corresponding event, a user 101 who is an administrator of the corresponding event, or a user 101 who is an artist associated with the event (e.g., "Kanye West").

As an example and not by way of limitation, when at least one of the notifications is sent to an administrator of the internal event listing 154, the notifications may include a request for the administrator to approve the update to the internal event listing 154. As another example, the notification may indicate that the associated internal event listing 154 has been created, and that the entity 161 can claim the associated internal event listing 154 as administrator. That is, the entity 161 may perform administrative operations on the associated internal event listing 154, such as updating the event listing 154, deleting the event listing 154, or sending the event listing 154 to other users 101 of the social-networking system 160.

Figure 6:
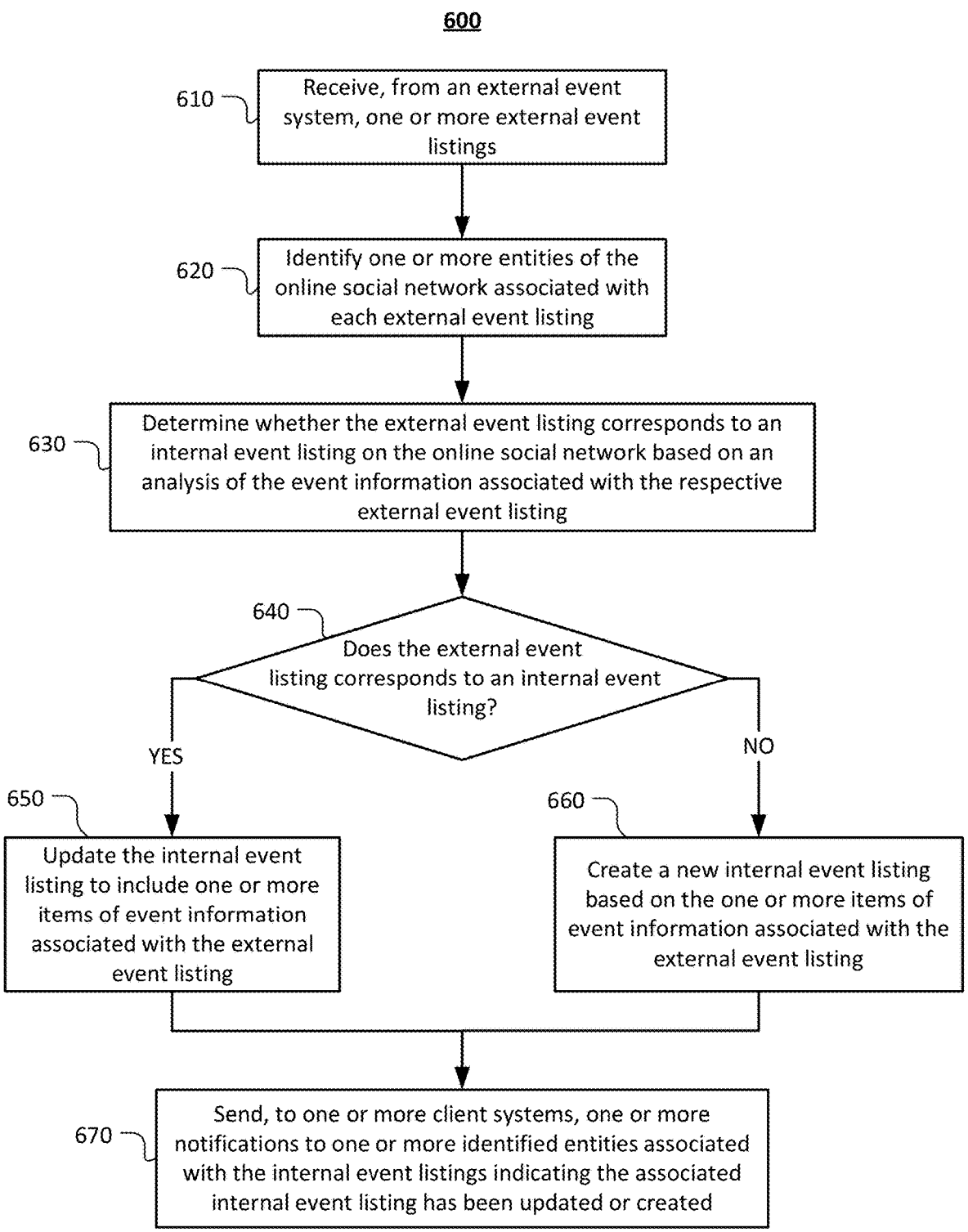
FIG. 6 illustrates an example method for aggregating events on a social-networking system.

FIG. 6 illustrates an example method 600 for aggregating events on a social-networking system 160. The method may begin at step 610, where the social-networking system 160 may receive, from an external event system, one or more external event listings. At step 620, the social-networking system 160 may identify one or more entities of the online social network associated with each external event listing. At step 630, the social-networking system 160 may determine whether the external event listing corresponds to an internal event listing on the online social network based on an analysis of the event information associated with the respective external event listing. At step 640, the social-networking system 160 may determine whether the external event listing corresponds to an internal event listing. At step 650, if the external event listing corresponds to an internal event listing, then the social-networking system 160 may update the internal event listing to include one or more items of event information associated with the external event listing. At step 650, if the external event listing does not correspond to an internal event listing, then the social-networking system 160 may create a new internal event listing based on the one or more items of event information associated with the external event listing. At step 670, the social-networking system 160 may send, to one or more client systems, one or more notifications to one or more identified entities associated with the internal event listings indicating the associated internal event listing has been updated or created.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for aggregating events on a social-networking system including the particular steps of the method of FIG. 6, this disclosure contemplates any suitable method for aggregating events on a social-networking system including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

De-Duping the Event System

In particular embodiments, duplicate event listings 154 representing a single real-world event may be identified and linked together, combined, or otherwise associated with each other to avoid unnecessary duplication and inconsistency. Two event listings 154 may be duplicates if both event listings 154 include one or more of the same information items 155, though duplicate event listings 154 need not be identical. Duplicate event listings 154 may be created separately, e.g., by different users 101 or at different times. A user 101 who creates a duplicate event listing 154 may be unaware of the existence of an existing event listing 154, or a user 101 may purposefully create a duplicate event listing 154 having one or more additional information items 155 that are not included in the existing event listing 154 or are to be kept separate from those in the existing event listing 154. A selected duplicate event listing 154 may be designated as a canonical event listing 154, and access to each of the other duplicate event listings 154, such as registering to attend an event or reading/writing event information items 155, may be directed to the canonical event listing 154 unless the access is specifically directed to one of the other (non-canonical) event listings 154. For example, a user 101 may create a duplicate event listing 154 intentionally to share with friends. Access to that event listing 154 by the user and the user's friends may be directed to the duplicate event listing 154 instead of the canonical event listing 154.

In particular embodiments, an event bucketization technique may be used to identify event listings 154 that are likely to correspond to a particular event. The identified event listings 154 may be processed further by a classifier, e.g., to determine their similarity scores. Event listings 154 that are not identified as being likely to correspond to a particular event may be ruled out, and thus need not be evaluated by the classifier. For example, two event listings 154a, 154f having locations separated by a substantial distance and times separated by a substantial amount of time are unlikely to correspond to the same event. The event bucketization technique may assign event listings 154 to buckets based on event listing information items 155 that have ranges of values such that different values imply different events. Examples of such information items 155 include event listing time and event location. When two event listings 154 are to be evaluated to determine whether they refer to the same real-world event, the buckets that correspond to the event listings 154 may be compared. If the event listings 154 correspond to different buckets, then the event listings are unlikely to correspond to the same events, and the classifier need not be used for those two event listings 154.

In particular embodiments, each bucket may be associated with a range of values of one or more items of event information 155, such as start time and location. A particular event listing 154 may correspond to the bucket(s) associated with the range(s) that include the event listing's particular information item values. As an example, for start time, time may be discretized into 1-hour time slots, and each time slot associated with one of 24 time buckets. Each event listing 154 may be placed into (e.g., associated with) multiple buckets that cover a range of values near the values of the event's corresponding information items 155. For example, an event listing 154 may be placed into three time buckets: a bucket for the event listing's start hour (which is the hour that includes the event's start time), a bucket for the hour immediately preceding the event listing's start hour, and a bucket for the hour immediately after the event listing's start hour.

As another example, for event location, geographic locations may be discretized into tiles, and each tile may be associated with a portion of a geographic map. A given latitude and longitude may be mapped to a tile on the geographic map. The sizes of the tiles may be configured according to a desired level of sensitivity (i.e., granularity) of event matching. Each event listing 154 may be placed into nine location buckets: a bucket for the event's location (which is the tile that includes the event listing's latitude and longitude coordinates), and buckets for the eight tiles surrounding the event listing's location. Thus each event listing 154 may be associated with 27 different buckets: 3 different hours and 9 different tiles. The buckets may be thought of as a hash table for which the key is a combination of the time bucket and the space bucket for particular event listing 154. When a new event listing 154 is created or an existing event listing 154 is moved in time or location, the classifier may be run for only the event listings in the 27 buckets associated with the new or changed event listing 154. The length of the time window used for event listing comparison may be changed by changing the lengths of the time buckets.

In particular embodiments, two event listings 154 having sufficiently similar information items, e.g., having a sufficiently close similarity score, may be classified as duplicates. To determine whether two event listings 154 are duplicates, a first step may be performed in which candidate event listings 154 that are close in time and space are identified, and a second step may be performed in which the classifier algorithm is run to determine similarity scores for event listings that are identified as being close in time and space, e.g., probabilities that two event listings 154 correspond to the same real-world event. Two event listings 154 having a similarity score of at least a threshold value may be considered duplicates.

In particular embodiments, even if there is a large number of event listings 154, e.g., 100 million, when a new event listing 154 is created, each bucket for the event listing 154 ordinarily contains a small number of events, e.g., 2, 3, 10, etc., which may be the existing event listings 154 in the relatively small temporal and geographic area around the new event listing. The classifier may be run on event listing pairs formed from those 2-10 other event listings 154 (and other affected pairs, e.g., in adjacent hours and adjacent map tiles) to re-calculate their similarity scores. After the calculation, the similarity score may be cached. Subsequently, a canonical event listing 154 may be identified using a cache lookup. Each cached similarity score may be stored on or otherwise associated with the canonical event listing 154 for which it was calculated. Event listings 154 may be stored in a database, and there may be a database entry for each event listing 154. The entry may include information items 155 such as the venue, start time, author, which other event listings are duplicates of this one, and their similarity scores (e.g., with respect to the canonical event listing 154 and/or with respect to other event listings 154). An indication of which event listing 154 is the canonical one may also be stored. Thus, a previously-identified canonical event listing 154 may be identified from cached information, without looking up the buckets or running the classifier again. The buckets and classifier may be used when an event listing 154 is created or moved in time or space, in which case the similarity scores for buckets associated with the moved event listing 154 may be recomputed, and the recomputed similarity scores and/or the identity of the canonical event listing 154 may be cached. In the example of 27 buckets, the event listings 154 in the 27 buckets may be recomputed and the similarity scores cached by storing them in the database.

Figure 7:
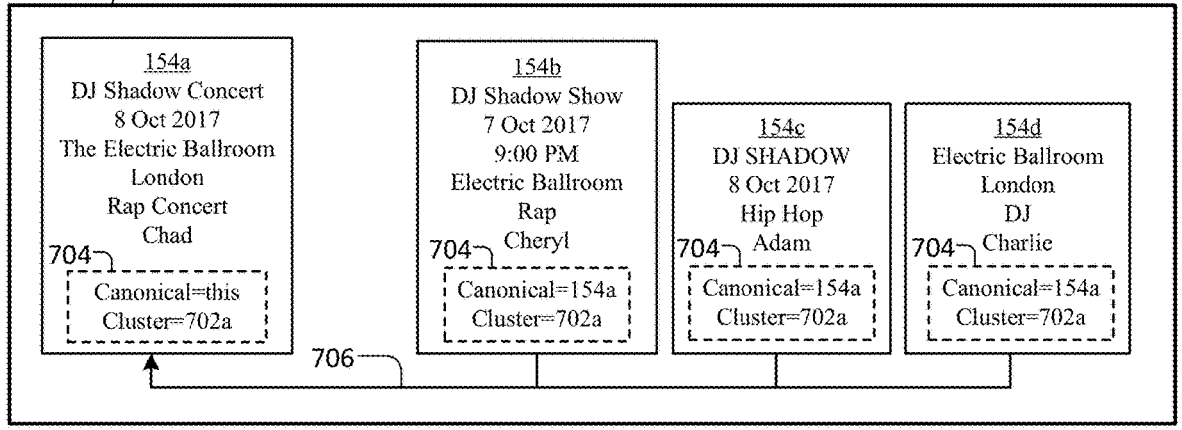
FIG. 7 illustrates an example in which duplicate event listings have been identified and linked together to form event listing clusters.
Figure 7:
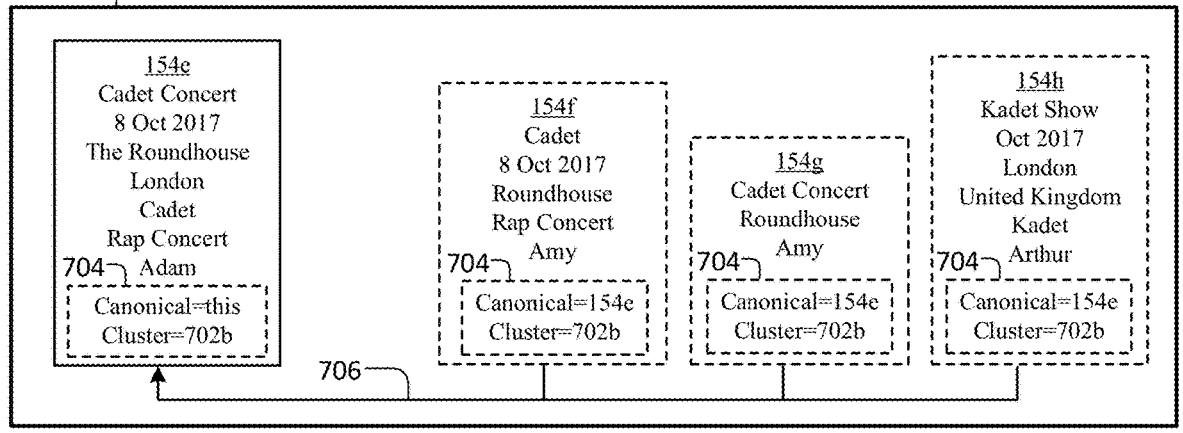
Figure 7:
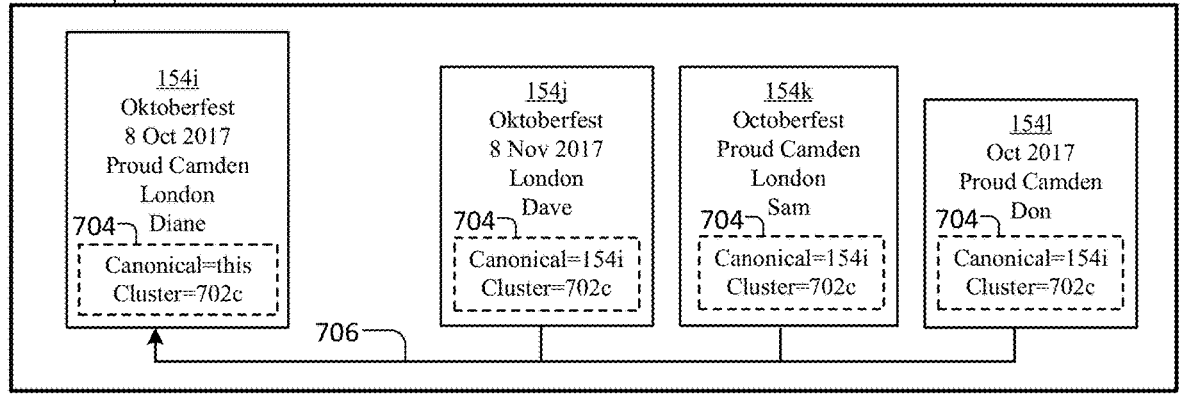

FIG. 7 illustrates an example 700 in which duplicate event listings 154 have been identified and linked together to form event listing clusters 702. One of the duplicate event listings 154a-d in a cluster 702a may be designated as a canonical event listing 154a. In particular embodiments, a social-networking system 160 may identify two or more event listings 154a-d that are likely to correspond to the same real-world event, and generate associations identifying the event listings 154b-d as duplicates of a canonical event listing 154a. Subsequently, requests to accesses the other duplicate event listings 154b-d in the cluster 702a, such as to retrieve or update information items 155, may be redirected to the associated canonical event listing 154a. Such requests may be redirected by default, unless the requests specifically indicate that the requested duplicate event listing itself, e.g., event listing 154b, is to be accessed. If such requests are not redirected or otherwise processed to control access to duplicate event listings 154a-d, inconsistencies and unnecessary duplication of event listing information may occur. Requests to access separate ones of the duplicate event listings 154a-d that correspond to the same event may be generated by users 101 who obtain one or more of the duplicate event listings 154a-d from searches, e.g., using two different queries that match the respective duplicate event listings 154a-d, by receiving links to the duplicate event listings 154 from other users via messages, or the like. In particular embodiments, duplicate event listings 154a-d may be identified when they are created, or subsequently to being created, e.g., when they are identified by a search query, referenced in a notification or message, presented to a user, or sent to an external system 170.

In particular embodiments, duplicate event listings 154 are not necessarily identical. Two or more event listings 154 that have one or more information items in common, e.g., the same name, location, and date, may be duplicates even if they also have different information items, e.g., different start times. Thus two or more event listings that identify and correspond to the same real-world event may be duplicates even if there are differences between the two event listings.

In particular embodiments, duplicate event listings 154 may be created inadvertently, e.g., as a result of actions by one or more users or entities. A user who creates a duplicate event listing 154b may be unaware of an existing event listing 154a that could have been used instead of creating a new event listing. A selected one of the duplicate event listings, which may be the existing event listing 154a or one of the subsequent duplicate event listings 154b, may be designated as a canonical event listing, and an access request for each of the other duplicate event listings 154b,c,d, such as a request to retrieve or modify an event listing, may be directed to the canonical event listing 154a unless the access request satisfies particular criteria for accessing the non-canonical event listing. Such criteria may be, e.g., that the user 101 requesting access is the creator of the non-canonical event listing 154a or a friend of the creator, as described below.

In particular embodiments, duplicate event listings 154 may be created intentionally by a user or entity, e.g., to maintain a separate copy of an event listing. For example, a user may intentionally create a private event listing for use by the user and his or her friends, in which case the user may request that accesses to the private event listing not be redirected to a canonical event listing. As another example, a user 101 may create a duplicate event listing intentionally 154b to share with friend, and access to that event by the user 101 and the friends may be directed to the duplicate event listing 154b instead of the canonical event listing 154a, while other users who are not friends of the user may be directed to the canonical event listing 154 if they attempt to access the duplicate event listing 154b. As another example, a duplicate event listing 154b may have one or more additional information items 155 that are not included in the existing event 154a or are to be kept separate from those in the existing event 154a, e.g., in case of subsequent changes to the duplicate event 154b that the user wishes to keep separate from or does not have permission to make to the existing event. For example, information items 155 of a duplicate event 154b that differ from information items in another otherwise similar event 154a may be of use to users, so the duplicate event 154b may be identified, linked to an event 154a of which it is a duplicate, stored in the data store 164, and made accessible by users (though access may be provided conditionally).

Note that the term "event listing" 154 used without an "internal" or "external" qualifier may refer to either an internal event listing 154 or an external event listing 154. The techniques described herein with reference to event listings 154 may be applied to either internal event listings 154 or external event listings 156.

The example 700 illustrates three event clusters 702a,b,c. Each event cluster 702a,b,c includes two or more event listings 154, one of which is a respective canonical event listing 154a,e,i, and the other(s) of which are duplicates of the canonical event listing 154a,e,i and contain redirection information 704 to the canonical event listing in their cluster 702a,b,c. As introduced above, in particular embodiments, different event listings 155 for the same real-world event may be created in a social-networking system 160 by, for example, different users 101, or by a single user at different times. Duplicate events may also be created by different external sources 130, 170, 180. As an example, a third-party system 170, a server system 180, and one or more client systems 130 operated by users 101 may create different event listings 154 for a Beyonce concert event. Each event listing 154 may include one or more items of event information 155, such as an event name, date, location, and so on.

In particular embodiments, the quality of an event listing 154 may be determined based on the information items 155 included in the event listing 154. For example, in a news feed, a user may join, e.g., register to attend, a Beyonce event listing 154 of low quality, e.g., an event listing 154 that has few details, but there may be another event listing 154 of higher quality, e.g., having more details, for the same real-world Beyonce event. The higher-quality event listing 154 may be considered more desirable, and should be presented to users instead of the lower-quality event listing 154, particularly when the higher-quality event listing 154 contains a superset of the information in the lower-quality event listing 154.

In particular embodiments, a canonical event listing 154a may be, for example, the most accurate, complete, or reliable of the duplicate event listings 154a-d. Users should see and be able to join the canonical event listing 154a for a particular real-world event, even if other duplicate event listings 154c-d have been created for the real-world event. Further, search results should ordinarily show the same canonical event listing 154a for a particular real-world event, regardless of how many duplicate events 154b-d representing the real-world event exist. When a user 101 requests to create a new online event, but a canonical event listing 154a already exists for the same real-world event, the canonical event 154*a* may be presented to the user, and the user informed that the new event listing may be a duplicate 154*b*, and asked to confirm that the new event listing is still to be created.

In particular embodiments, the social-networking system 160 may present one or more event listings 154 to a user 101 in response to a search query. For example, the user 101 may search for event listings 154 that contain a particular query term, such as the name of an artist (e.g., Kanye West), venue (e.g., Levi's Stadium), location (e.g., Santa Clara), or other information item of an event listing 155. If there are duplicate event listings 154*a-d* in the event system (e.g., stored in an event database), the search query may match one or more of the duplicate event listings. For a particular real-world event, the search results may include the canonical event listing 154*a* but not the other duplicate event listings 154*b, c, d*. Alternatively, the search results may include the canonical event listing 154*a* and one or more of the duplicate event listings 154*b-d*, in which case the canonical event listing 154*a* may be the highest-ranked search result, and the other duplicate event listings 154*b-d* may be ranked below the canonical event listing 154*a*.

Figures 8A, 8B:
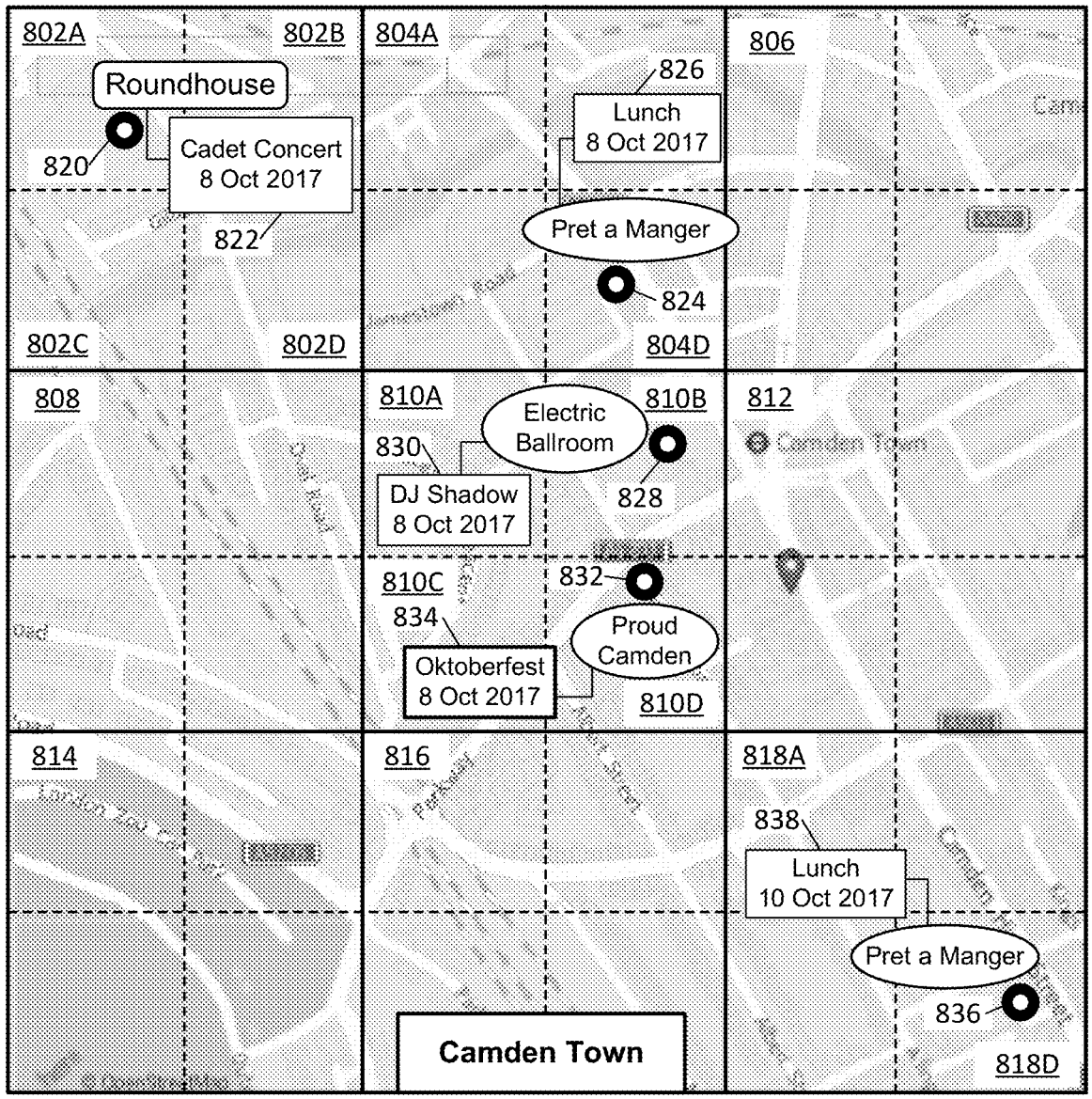
FIG. 8A illustrates an example map divided into geographic map tiles.
FIG. 8B illustrates an example timeline divided into time increments.

FIG. 8A illustrates an example geographic map 800 divided into geographic map tiles. The map 800 is divided into nine large tiles 802-818, eight of which are adjacent to a large center tile 810. The large tiles are divided by solid lines. The map is also divided into 36 small tiles, which are divided by dashed and solid lines. Each large tile is identified by a numeric reference number and divided into four small tiles, which are identified by the numeric reference number of the large tile followed by a letter A, B, C, or D. For example, the large tile 802 is divided into small tiles 802A-D by dashed lines. The large tiles correspond to a first resolution in which the large tiles are increments, and the small tiles correspond to a second resolution in which the small tiles are increments that are smaller but more densely arranged than those of the first resolution. Note that although FIG. 8A illustrates map tiles of particular sizes, this disclosure contemplates map tiles of any suitable sizes. For example, the map tiles could be of differing sizes based on object density, as described in U.S. Pat. No. 8,914,393, issued on 16 Dec. 2014, which is incorporated by reference herein.

In particular embodiments, the locations of event listings 154 on the map 800 may be used to place the event listings 154 in buckets that correspond to the map tiles, and the resulting bucketization may be used to identify event listings 154 that are likely to correspond to the same events because of the geographic proximity between the event listings 154. Two event listings may be more likely to correspond to the same event if the two event listings are in the same tile or adjacent tiles, and less likely (e.g., unlikely) to correspond to the same event if the two event listings 154 are in non-adjacent tiles (e.g., tiles whose edges do not touch and whose corners do not touch). Thus, a first event listing 154*a* is more likely to correspond to the same real-world event as a second event listing 154*b* if the second event listing 154*b* is located in the same tile as the first event listing 154*a* or in one of the eight tiles surrounding the first event listing's tile, and less likely to correspond to the second event 154*b* if the second event listing 154*b* is not located in one of those nine tiles according to this bucketization criteria. In this example, in the first resolution, eight large tiles are adjacent to any particular large tile, while in the second resolution, eight small tiles are adjacent to any particular small tile.

In particular embodiments, the choice of which resolution to use may be made based on factors such as the density of event locations on the map or the number of candidate event listings 154 identified for processing by the classifier. If the density of event locations is low, then a "lower" resolution with larger tiles may be used, since each the average number of events in each tile may be relatively low, and vice-versa. Smaller tile sizes are more likely, on the average, to exclude nearby event listings from being passed on to the classifier, and thus may generate fewer candidates for processing by the classifier than larger tile sizes. Thus, smaller tile sizes may be used to reduce the amount of computational resources used by the classifier to score and cluster event listings 154. The tile size may also be selected based on the geographical area of interest to the user. For example, if the user has selected a map resolution at the neighborhood level or frequently attends events in a particular neighborhood, then small map tiles that divide up a neighborhood may be selected. Alternatively, if the user selects or searches a map resolution at the city level, or frequently attends events located throughout a city, then larger map tiles that divide up a city but may include entire neighborhoods may be selected. The tile size may be based on any other suitable factors. For example, if a large percentage of the event listings 154 are often placed in a single tile, then the tile size may be decreased. If few event listings 154 (e.g., 0 or 1) are placed in each tile, then the tile size may be increased.

In the example of FIG. 8A, the locations and times of several example event listings are shown on the map 800. A "Cadet Concert" event 822 starting on 8 Oct. 2017 is located at "Roundhouse" 820 in map tile 802A. A "Lunch" event 826 starting on 8 Oct. 2017 is located at "Pret a Manger" 824 in tile 804D. A "DJ Shadow" event 830 starting on 8 Oct. 2017 is located at "Electric Ballroom" 828 in tile 810B. An "Oktoberfest" event 834 starting on 8 Oct. 2017 located at "Proud Camden" 832 is in tile 810D. Another "Lunch" event 838, this one starting on 10 Oct. 2017, is located at "Pret a Manger" 836 in tile 818. The events may be placed into location buckets according to their geographical locations.

In the large-tile resolution, the "Cadet Concert" event 822 is placed in tile 802, the "Lunch" event 826 is placed in tile 804, the "DJ Shadow" event 830 and the "Oktoberfest" 834 event are placed in tile 810, and the "Lunch" event 838 is placed in tile 818. Thus, if only the location dimension is used to identify event listings 154 that are unlikely to correspond to the same event, then, evaluating each event, the "Cadet Concert" event 822 in tile 802 may correspond to the same event as any of (1) the "Lunch" event 826 in tile 804, (2) the "DJ Shadow" event 830 in tile 810, or (3) the "Oktoberfest" event 834 in tile 810. The "Lunch" event in tile 818 is in a non-adjacent tile and is therefore unlikely to correspond to the same event as the "Cadet Concert" event 822. Thus, when identifying event listings that may correspond to the same event as the "Cadet Concert" event 822, the three events 826, 830, and 834 may be evaluated further, e.g., by computing their similarity scores relative to event 822 using the classifier. The "Lunch" event 826 in tile 804 may be evaluated similarly to obtain the same result. The two event listings 830, 834 in the large center tile 810 are located adjacent to all of the other large tiles on the map 800, so all of the other events on the map 800 may be evaluated further when identifying event listings that are potentially for the same event as each of the two event listings 830, 834. The "Lunch" event 838 in tile 818 is located adjacent to tile 810, but not to tiles 802 and 804. Thus, the events 830, 834 in tile 810 may be evaluated further when identifying event listings that are potentially for the same event as the "Lunch"

event listing 838, but the event 822 in tile 802 and the event 826 in tile 804 need not be evaluated further for event listing 838.

In the small-tile resolution, the "Cadet Concert" event 822 is placed in tile 802A, the "Lunch" event 826 is placed in tile 804D, the "DJ Shadow" event 830 is placed in tile 810B, the "Oktoberfest" 834 event is placed in tile 810D, and the "Lunch" event 838 is placed in tile 818D. Thus, if only the location dimension is used to identify event listings 154 that are unlikely to correspond to the same event, then, evaluating each event, for the "Cadet Concert" event 822 in tile 802A, every other event listing on the map 800 may be excluded from further evaluation because tile 802A is not adjacent to the tiles of any other events on the map. For the "Lunch" event 826 in tile 804D, the "DJ Shadow" event listing 830 is in an adjacent tile (810B) and may thus be evaluated further (e.g., by the classifier) to determine whether it may correspond to the same event as the "Lunch" event listing 826. No other event listings on the map are adjacent to tile 804D, so there are no other event listings to be evaluated further for the "Lunch" event 826. Similarly, for the "DJ Shadow" event listing 830 in tile 810B, the "Lunch" event listing 826 in tile 804D and the "Oktoberfest" event listing 834 in tile 810D are adjacent to tile 810B and may be evaluated further. For the "Oktoberfest" event listing 834 in tile 810D, the "DJ Shadow" event 830 in tile 810B is adjacent and may be evaluated further. For the "Lunch" event listing 838 in tile 818D, there are no adjacent events, so every other event on the map 800 may be excluded from further evaluation. In this example, using small tiles has excluded more events from further evaluation by the classifier than were excluded when using large tiles on the same map 800, because event listings at locations more distant than one tile are excluded.

FIG. 8B illustrates an example timeline 850 divided into time increments 852-862. Event listings may be placed in, e.g., associated with, particular time increments. For example, event listings may be placed in time increments that correspond to the start times (or dates) associated with the event listings. On the example timeline 850, event listings 820, 826, 830, and 834 are placed in time increment 856 ("8 Oct. 2017") and event listing 838 is placed in time increment 860 ("10 Oct. 2017"). In particular embodiments, for each event listing, another event listing that is in the same time increment or an adjacent time increment is more likely to correspond to the same event, while another event listing that is not in the same or an adjacent time increment is less likely to correspond to the same event. Thus, the time increments in which two event listings are placed may be used to determine whether to evaluate the two event listings in more detail to determine if they represent the same event, or to rule out the possibility that they represent the same event without performing more detailed evaluation. The time increments bucketization may be used as the only factor in this determination, or may be combined with other factors such as map tile location bucketization.

Two of the time increments, "7 Oct. 2017" 854 and "9 Oct. 2017" 858, are adjacent to the time increment "8 Oct. 2017" 856, into which four of the events (822, 826, 830, and 834) are placed. One event (838) is placed in the time increment "10 Oct. 2017" (860), which is not adjacent to the time increment "8 Oct. 2017." The remaining event, event 838, occurs on 10 Oct. 2017 and is placed in time increment 860. Each of the example event listings may be evaluated with respect to another one of the event listings to determine whether the two event listings are likely or unlikely to correspond to the same event.

In the example of FIG. 8B, for event listing 822, event listings 826, 830, and 834 are in the same time increment and may thus be placed in the same bucket as event listing 822. Each of the event listings 826, 830, 834 is thus more likely to correspond to the same event as event listing 822, and may be processed further (e.g., by the classifier). Similarly, for each of the event listings 836, 830, and 834, the other three events in the 8 Oct. 2017 time increment may be processed further. Further, for each event listing 822, 826, 830, and 834, the event listing 838 is unlikely to correspond to the same event, and need not be processed further.

Each time increment on the timeline 850 corresponds to one day. In particular embodiments, the time increment size may be changed to larger increments such as months, or smaller increments such as hours. The time increment size may be based on how closely selected event listings occur in time, for example. The selected event listings may be the event listings having locations within nine adjacent tile squares on the map 800. The time increment size may be determined based on the average time difference between the selected events, or on any other suitable factors. For example, if a large percentage of the event listings are often placed in a single time increment, then the time increment size may be decreased. If few event listings are placed in each time increment (e.g., 0 or 1 listings), then the time increment size may be increased.

In particular embodiments, with reference to FIGS. 8A-8C, the social-networking system 160 may receive a first event listing 834 ("Oktoberfest") corresponding to a first event. The first event listing 834 may be understood as an event listing that has been received or otherwise identified, e.g., identified as a canonical event listing. Other event listings may then be evaluated to determine whether they are duplicates of the first event listing 834. The other event listings being evaluated relative to the first event listing 834 may be referred to as "candidate" event listings. Event listing 834 is used as the first event listing in this example for explanatory purposes. Any of the other event listings shown in FIGS. 7 and 8A may alternatively be used as the first event listing.

The first event listing 834 is shown in further detail as event listing 154*i* ("Oktoberfest") in FIG. 7. The first event listing 834 may include one or more items of event information 155 associated with the first event, and the items of event information 155 may include at least a time ("8 Oct. 2017") and a geographic location ("Proud Camden" and "London").

FIG. 8C illustrates an example two-dimensional array 880 of map tiles and time increments. In particular embodiments, a condition based on the values of two or more event listing information items, e.g., geographic location and time, may be evaluated to determine whether to perform further, e.g., more detailed processing, such as invoking a classifier. When comparing two event listings, if, for each pair of event listings evaluated, the values of the information items for the two event listings are sufficiently close, e.g., in the same or adjacent tiles, the same or adjacent time increments, or the like, then the two event listings may be likely to correspond to the same event. In particular embodiments, a range of values for an event listing information item may be represented as an array of values. If a condition having multiple information items is to be evaluated, then the range of values of each information item may be represented as a dimension of a K-dimensional array, where K is the number of information items to be evaluated. As an example, when the location and time information items are to be evaluated, the range of location values may be represented as a first array dimension, and the range of time values may be represented as a second array dimension, as shown by the array 880 of FIG. 8C. The array 880 has a location dimension 864 corresponding to a location information item of event listings and a time dimension 866 corresponding to a time information item of event listings. The location dimension 864 is shown as nine rows that correspond to map tiles 802-818, and the location dimension 866 is shown as six columns that correspond to time increments 852-862.

In particular embodiments, for a given set of candidate event listings, a subset of the candidate event listings for which a similarity score relative to a first event listing is to be computed may be identified using the two-dimensional array 880. The subset may be determined by identifying a first bucket of the array 880 in which the first event listing is placed and, for each candidate event listing, determining whether the value of each of the two information items of the candidate event listing places the candidate event listing in the first bucket of the array or in one of the buckets of the array adjacent to the first bucket. For example, to determine which of the example event listings 822, 826, 834, 838 are be passed to the classifier for similarity score calculation relative to a first event listing 830, the event listings may be placed in buckets of the array 880. Although the event listing 830 is selected as the first event listing relative to which the other event listings are evaluated in this example, any desired event listing may be selected as the first event listing. The first event listing 830 in this example is placed in bucket 882c of the array 880 because the location of the event listing 830 is map tile 810 (the large tiles are used in this example), and the time of the event listing 830 is time increment 856 ("8 Oct. 2017"), so the first event listing 830 is placed in bucket 882c, which is referred to as a first bucket. The buckets in which the candidate event listings are placed in this example are as follows, as shown in FIG. 8C: event listing 822 is in map tile 802 and time increment 856, so is placed in bucket 882a; event listing 826 is in map tile 804 and time increment 856, so is placed in bucket 882b; event listing 834 is in map tile 810 and time increment 856, so is placed in bucket 882c; and event listing 838 is in map tile 818 and time increment 860, so is placed in bucket 882d.

In particular embodiments, the social-networking system 160 may bucketize the first event listing 834 based on the time and location of the event by placing the first event listing 834 in a first bucket 882c of an array 880 (shown in FIG. 8C). A first dimension 864 of the array 880 may correspond to time increments 852-862, and a second dimension 866 of the array may correspond to geographic map tiles 802-818. The bucketization may place the first element in the corresponding bucket 882c based on the first event listing's map tile 810 and time increment 856. The first bucket 882c may thus correspond to the time increment 856 including the time of the first event and the geographic map tile 810 including the geographic location of the first event. A map may be divided into map tiles (hereinafter simply "tiles"), where each tile represents a particular geographic area of the map. Thus, particular locations may be within particular tiles of a map. As an example and not by way of limitation, a location X may be within a first tile, and locations Y and Z may be within a second tile. More information on geographic map tiles may be found in U.S. Pat. No. 8,914,393, issued on 16 Dec. 2014, which is incorporated by reference herein.

In particular embodiments, the social-networking system 160 may identify one or more second event listings 822, 826, 834, and 838 corresponding to one or more second events, respectively. Each second event listing may include one or more items of event information 155 associated with the respective second event. The items of event information 155 may include at least a time of the respective second event and a geographic location of the respective second event. Each second event listing may have a time and geographic location placing it in the first bucket 882c of the array or one of the buckets of the array adjacent to the first bucket 882c. As an example and not by way of limitation, the adjacency is between map tiles or between time increments, and is not necessarily between elements of the array 800.

To determine which of a set of candidate event listings 822, 826, 834, 838 are to be passed to the classifier for similarity score calculation, for each candidate event listing, the bucket in which the candidate event listing is placed may be compared to the first bucket (in which the first event listing is placed). If the buckets are the same, or are adjacent to each other, then a similarity score may be calculated for the candidate event listing. In this example, candidate event listing 834 is in the same bucket 882c as the first event listing 830, so a similarity score may be calculated between event listing 834 and the first event listing 830. No other candidate event listings are in the same bucket as the first event listing 830 in this example. However, map tiles 802 and 804 are both adjacent to map tile 810, so candidate event listings 822 in map tile 802 and candidate event listing 826 in map tile 804 are in map tiles adjacent to the map tile of the first event listing 830, and are in the same time increment 856 as the first event listing 830. Thus, similarity scores may also be calculated for candidate event listings 822 and 826. Candidate event listing 838 is in an adjacent tile (tile 818 is adjacent to tile 810), but is not in an adjacent time interval (interval 862 is not adjacent to interval 856). Thus, a similarity score need not be calculated for event listing 838.

Although the example array 880 has a location dimension having nine map tile entries and a time dimension having six time increment entries, other sizes and element types are possible. For example, the location dimension may alternatively have five entries corresponding to four map tiles to the north, south, east, and west of a specified tile 810C and the specified tile 810C itself, or 25 entries corresponding to a 5×5 square of map tiles centered on the specified tile 810C. The time dimension may alternatively have three entries corresponding to a specified increment 856 and the two increments 854, 848 adjacent to the specified increment 856, or eleven entries corresponding to the specified increment 856 and five consecutive increments on each size of the specified increment 856. Increasing the number of entries in the array in either or both dimensions to include more values may be understood as increasing the bucket size, and may cause more candidate event listings to be placed in a bucket and processed further, e.g., by the classifier.

In particular embodiments, the social-networking system 160 may compute, for each of the second event listings, a similarity score between the first event listing and the second event listing. The similarity score may be based on a comparison of the event information of the first event listing and the event information of the second event listing.

In particular embodiments, a trained machine-learning model referred to herein as an event classifier may identify event listings 154 that are similar to each other by comparing pairs of event listings 154 and generating a similarity score based on a probability that the two event listings 154 correspond to the same real-world event. Canonical event listings 154a may then be identified by selecting one of the event listings 154a-d that has the greatest similarity score of the event listings 154a-d. Alternatively, or additionally, a set of the highest-ranking event listings 154 may be selected, and a rule-based system may be used to identify the canonical event 154a. The rule-based selection is described in further detail below. In particular embodiments, the classifier may receive features of two event listings 154a,b as input and generate a similarity score, which may be based on a probability that the two event listings 154a,b correspond to the same real-world event. Given two event listings 154a,b, a list of features may be generated and provided as input to the classifier, and the similarity between the two event listings 154a,b may be determined by the classifier based on the similarities between their features such as their information items 155. The event listing features may include: event title, start time, location, distance between the two events, number of attendees, event host, how many words or tokens of the titles of the two events match, what percent of the descriptions are similar, how many people who joined (e.g., registered to attend) the first event listing 154a also joined the second event listing 154b, and so on. Note that an exact match is not needed between the values of certain information items 155, because different values may represent the same actual item. For example, for the event location, different addresses or latitude/longitude coordinates may represent the same place. Similar titles are also likely to refer to the same event.

Although event listings 154 are described above as being compared to generate a similarity score, the classifier as implemented does not necessarily operate directly on two different event listings 154. Instead, the classifier's input may be a single "combined" vector for each pair of event listings 154. The vector may be generated based on pairwise comparisons or combinations of information items 155 of the two event listings 154, and the classifier may convert the vector into a similarity score. The vector may include feature scores generated from the two event listings 154 being compared. One feature score may be a count of how many (or what percentage) of the tokens in the descriptions of the event listings 154 are exactly the same. Other feature scores may include the difference in seconds between the start times of the two event listings 154, the difference in miles between the locations of the two event listings 154, how many administrators each of the two event listings have, and how many users have joined both event listings (before they were known to be the same). The output of the classifier may be a similarity score representing a probability that the two event listings 154 correspond to the same real-world event. The similarity score may be in the range 0 to 1, for example. A threshold similarity score may be used to determine whether each event listing 154 is one of a set of best-matching event listings. For example, each event listing 154 that has a similarity score of 0.9 or greater may be included in the set of best-matching event listings. The best-matching event listings may then be ranked in an order, and the top-ranked one selected as the canonical event 154a.

In particular embodiments, the classifier may be a machine-learning model trained using human-labeled event data. A list of candidate event listings 154 may be generated, which may include event listings 154 that have similar starting times and are geographically located near each other. Pairs of the candidate event listings may be presented to a human editor, who indicates whether the two event listings in each pair are the same, i.e., correspond to the same real-world event. The human editor labels the pair "yes" if he or she thinks the event candidate listings are the same, or "no" if not. From the labeled candidate event listings, the classifier may learn which of the features are important for deciding whether two event listings 154 are the same, e.g., correspond to the same real-world event. For example, if the titles of two event listings 154 are very similar, or the same host is an administrator for both event listings, the two event listings 154 are likely to be the same. The classifier may be implemented using a gradient boosted decision tree, for example, or other suitable machine-learning technique.

Referring to FIG. 7, to identify the canonical event listings 154a,e,i, the set of event listings 154a-1 may be divided into clusters 702 by calculating the similarity scores between the event listings 154a-1 and using the similarity scores as input to a clustering algorithm. The clustering algorithm may be k-means clustering or other appropriate algorithm. The similarity scores between each pair of event listings 154a-1 may be computed to form a similarity matrix M, in which entry M(i, j) is the similarity score between the $i^{th}$ and $j^{th}$ event listings 154a-1. For each cluster, the similarity scores in each cluster 702a,b,c may be ranked, and the event listing 154 having the top-ranking similarity score may be designated the canonical event listing 154a,e,i of the respective cluster.

In the example shown in FIG. 7, the identified clusters include a first cluster 702a containing four duplicate event listings: 154a (name="DJ Shadow Concert"), 154b (name="DJ Shadow Show"), 154c (name="DJ SHADOW"), and 154d (no name item, but having other items 155 similar to listings 154a-c). The event listing 154a ("DJ Shadow Concert") includes the following information items: a name ("DJ Shadow Concert"), a date ("7 Oct. 2017"), a venue ("The Electric Ballroom"), a location ("London"), an event type or genre ("Rap Concert"), and the name of a user who created the event listing ("Chad"). The canonical event listing in each cluster 702 may be the highest-ranking event listing 154 in the cluster 702. The highest-ranking event listings are "DJ Shadow Concert" 154a, "Cadet Concert" 154e, and "Oktoberfest" 154i in clusters 702a,b,c, respectively. The other event listings 154b-d in the cluster 702a, although different from the canonical event listing 154a, are sufficiently similar to be placed in the same cluster as event listing 154a (e.g., by a clustering algorithm based on the similarity scores of the event listings 154a-d). The event listing 154b ("DJ Shadow Show") includes the following information items: a name ("DJ Shadow Show"), a date ("5 Oct. 2017"), a time ("9:00 PM"), a venue ("Electric Ballroom"), a genre ("Rap"), and a creator name ("Cheryl"). The event listings 154a, 154b have similar names ("DJ Shadow Concert" and "DJ Shadow Show"), similar dates ("7 Oct. 2017" and "5 Oct. 2017"), a similar venue ("The Electric Ballroom", "Electric Ballroom"), and similar genres ("Rap", "Rap Concert"). Thus, although there are differences in the values of information items of the event listings 154a, 154b, the similarities are sufficient for these event listings to be classified as duplicates and placed in the same cluster 702a. Similarly, the event listings 154c ("DJ SHADOW") and 154d (no name) are sufficiently similar to the canonical event listing 154a to be classified as duplicates and placed in the same cluster.

A second cluster 702b contains event listings 154e ("Cadet Concert"), 154f ("Cadet"), 154g ("Cadet Concert"), and 154h ("Kadet Show"). As in the first cluster 702a, although there are differences in the values of information items of the event listings 154e-h, the similarities are sufficient for the two event listings to be classified as duplicates and placed in the same cluster 702b. The non-canonical duplicate event listings 154f-h are configured to be hidden event listings in this example, and so are not displayed to users except in particular conditions. The information items of the hidden event listings 154f-h are searchable, however, so a search for "Kadet" matches the name of event listing 154h ("Kadet Show"). Since event listing 154*h* is a hidden event listing, the corresponding canonical event listing 154*e* may be displayed as a search result instead of the non-canonical event listing 154*h*. As an example of conditions in which the hidden duplicate event listings 154*f-h* may be displayed to users, the user "Amy" who created the non-canonical event listings 154*f* and 154*g* may access the event listings 154*f* and 154*g*, e.g., as search results and make them available to other users, such as friends or other connections of user "Amy."

A third cluster 702*c* contains event listings 154*i* ("Oktoberfest"), 154*j* ("Oktoberfest"), 154*k* ("Octoberfest"), and 154*l* (no name item, but having other items 155 similar to listings 154*i-k*). As in the first cluster 702*a*, although there are differences in the values of information items of the event listings 154*i*-1, the similarities are sufficient for these event listings to be classified as duplicates and placed in the same cluster 702*c*.

In particular embodiments, event listings 154 may be discarded from each cluster based on a comparison of the similarity score of each event listing 154 to a threshold. For example, the top K event listings 154 in each cluster may be retained, and listings ranked lower than K may be discarded, for a threshold value K (e.g., 3, 5, 8, 10, or another suitable value). In FIG. 7, for example, the value of K may be 4, resulting in the canonical event listing and three other event listings being retained in each cluster 702. As another example, each event listing 154 having a similarity score greater than or equal to a value N may be retained, and each event listing having a similarity score less than N may be discarded. The value N may be, e.g., 0.9, 0.8, 0.75, 0.5, 0.333, or other suitable value (where similarity scores range from 0 (least similar) to 1.0 (most similar)).

In particular embodiments, the social-networking system 160 may update a set of second event listings 154*b-d* so that each second event listing having a similarity score greater than a threshold includes redirection information 704 to a first event listing 154*a*. The redirection information 704 may identify the second event listings as being in an event cluster 702*a* with the first event listing 154*a*. The redirection information may further identify a canonical event listing in the event cluster to which the other event listings in the cluster are redirected. In particular embodiments, to update each second event listing having a similarity score greater than a threshold score to include redirection information to the first event listing, the social-networking system 160 may store a reference to the first event listing in the canonical event listing. In particular embodiments, the social-networking system 160 may receive, from a client system, a request to retrieve an event listing having specified event information. The social-networking system 160 may identify the event listing based on the event information, and the event listing may include the redirection information. The social-networking system 160 may identify, using the redirection information, the canonical event listing, and send, to the client system, instructions for presenting the canonical event listing in response to the request.

In particular embodiments, each non-canonical event listing 154 in each cluster 702 may be updated to include redirection information 704 to the canonical event listing 154 in the cluster. The redirection information 704 may include a link or reference to the canonical event listing 154, which may create the association 706 from the non-canonical event listings 154 to the canonical event listing 154. Further, the redirection information 704 may identify the cluster of which the event listing 154 is a member.

For example, the redirection information 704 in each non-canonical event listing 154 includes a canonical link item having a value that references the cluster's canonical event listing 154. In the example 700, the canonical link value in each non-canonical event listing 154*b-d* in the first cluster 702*a* is set to "154*a*" to indicate that event listing 154*a* is the canonical event listing linked to the non-canonical event listing. The canonical link value in the canonical event listing 154*a* may be set to a value such as "this" or null to indicate that the event listing 154*a* itself is the canonical event listing 154*a*. Alternatively, the canonical link value in the canonical event listing 154*a* may be set to a value that references the canonical event listing 154 itself (e.g., 154*a*). An implementation-appropriate type of value, such as an event listing identifier, may be used for the canonical link value in place of the reference number, which is used for illustrative purposes in this example. The redirection information 704 may also include a cluster item that identifies the cluster of which the event listing 154 is a member. In the example 700, the cluster value of each event listing 154*a-d* is set to "702*a*" to indicate that each event listing is a member of cluster 702*a*. Although the cluster value is set to a reference number in this example, the cluster value may be set to a different type of value that identifies the cluster 702*a*, or the event listings in the cluster may be identified by a different type of association.

In the example 700, for the second cluster 702*b*, the canonical link's value in each non-canonical event listing 154*f-h* in the second cluster 702*a* is 154*e* to indicate that event listing 154*e* is the canonical event listing linked to the non-canonical event listing. Further, the cluster value in each event listing 154*e-h* is 702*b* to indicate that each event listing 154*e-h* is in the cluster 702*b*. For the third cluster 702*c*, the canonical link's value in each non-canonical event listing 154*j*-1 in the second cluster 702*a* is 154*i* to indicate that event listing 154*i* is the canonical event listing linked to the non-canonical event listing. Further, the cluster value in each event listing 154*i*-1 is 702*c* to indicate that each event listing 154*i*-1 is in the cluster 702*c*.

The canonical and cluster items in the example redirection information 704 may be stored as information items 155, and may be hidden information items 206 so they are not presented to users. Alternatively, the canonical and cluster values may be represented as values other than information items 155, e.g., as variables or other types of attributes of the event listings 154. Alternative implementations of the redirection information 704 are possible. For example, a data structure separate from the information items may be used instead, e.g., a table of clusters that identifies the event listings 154 in each cluster 702 and identifies which of the event listings 154 is the canonical event listing 154 in each cluster 702.

In particular embodiments, the social-networking system 160 may send, responsive to a request to access one of the event listings in the cluster, instructions for presenting an event-listing interface comprising a reference to the canonical event listing. The event-listing interface may be part of a search-results interface, a newsfeed interface, or other user interface of the social-networking system 160. The event-listing interface may include references to the other event listings in the cluster, and the canonical event listing may be presented at a higher rank than the other event listings in the cluster in the event-listing interface. The other event listings in the cluster may be ranked according to their similarity scores with respect to the canonical event listing.

In particular embodiments, the similarity score for each of the second event listings may be determined using a machine-learning model. The machine-learning model may receive one or more feature vectors having one or more feature values including a first feature value based on the first event listing and a second feature value based on the second event listing, and compute the similarity score based on the first and second feature values. The feature values may include a count of how many strings in the first event listing are the same as strings in the second event listing, a difference in time between the start times of the first and second event listings, a difference in distance between the locations of the first and second event listings, or other values based on information items of the event listings.

In particular embodiments, the second event listings may be received from an external event system, a user of the online social network, a notification on the online social network, a message on the online social network, and/or a list of search results.

In particular embodiments, a rule-based system may be used to identify the canonical (e.g., best-matching) event listing by evaluating rules. The rules may be used instead of or in addition to other techniques for identifying the canonical event listing, such as selecting the highest-ranking duplicate event listing as the canonical event listing as described elsewhere herein. The rules may be based on one or more information items of each event listing in the event cluster, and may be evaluated in an order. A first rule may check whether one of the event listings is an official event listing that was received from a trusted event provider, such as TICKETMASTER or a highly-trusted partner. If so, the event listing may be the canonical event listing.

In particular embodiments, a second rule may determine whether the creator of the event listing is a verified user. If so, then the event listing may be the canonical event listing. As an example, if the venue of the event listing is the same as the venue that created the ticket, then the event may be the canonical event listing. Thus, for example, if the venue Levi's Stadium created a Beyonce event listing, and the event's location information item indicates that the event takes place in Levi's Stadium, then that event listing is the canonical event, and may be assigned a higher preference than other Beyonce events that take place in Levi's stadium created by users other than the Levi's Stadium user account.

In particular embodiments, a third rule, which may be used as a fallback, may determine how many people are registered to attend (e.g., are going to) the event. The event that has the most attendees may be the canonical event. The first rule may have more weight than the second rule, and the second rule may have more weight than the third rule. For example, if a famous artist such as "50 Cent" has a user account with a verified badge and creates an event listing, then the event listing created by "50 Cent" may be ranked higher than another event listing that has more registered attendees.

Figure 9:
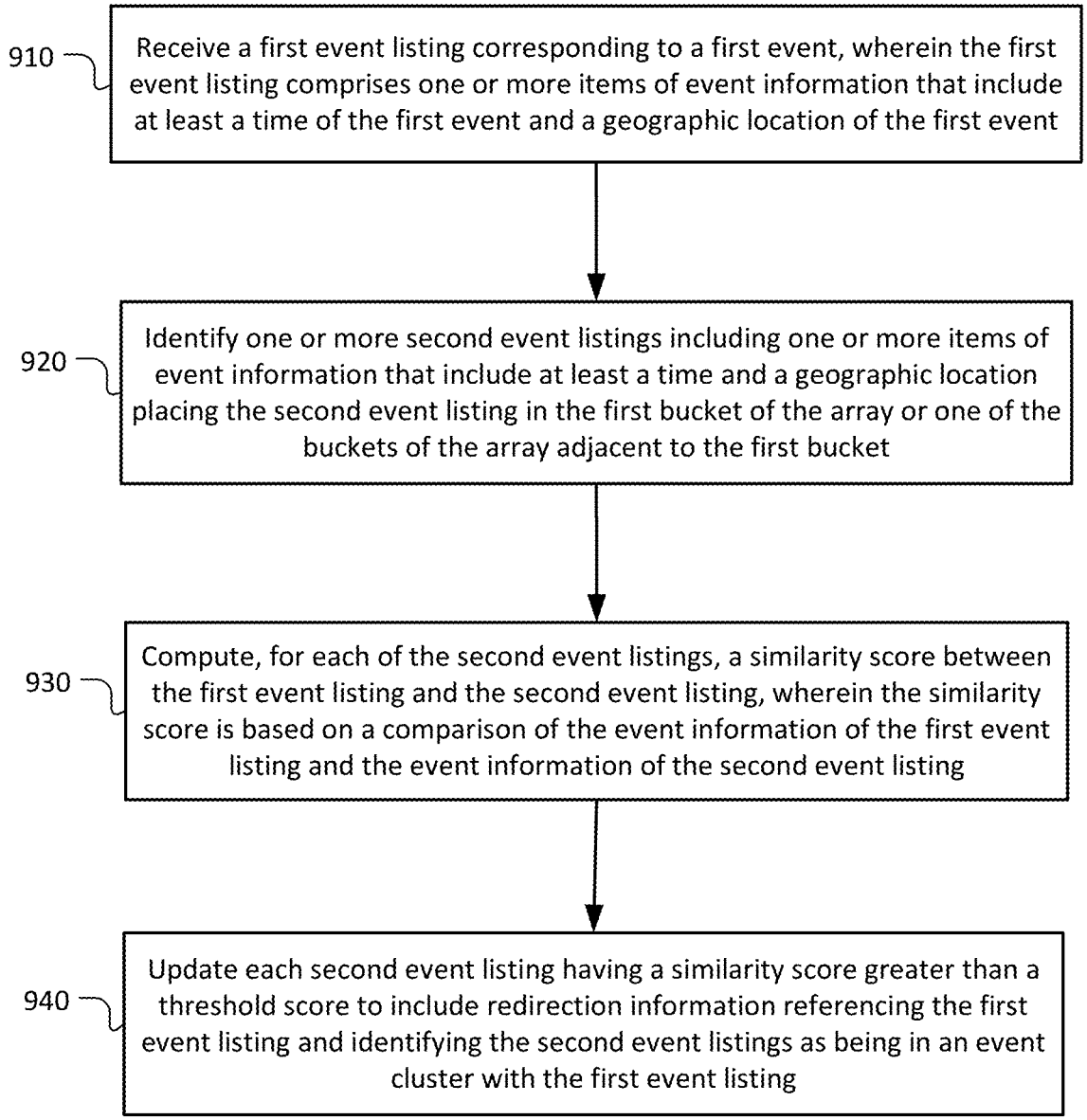
FIG. 9 illustrates an example method for de-duplicating events on a social-networking system.

FIG. 9 illustrates an example method 900 for de-duplicating events on a social-networking system 160. The method may begin at step 910, where the social-networking system 160 may receive a first event listing corresponding to a first event, wherein the first event listing comprises one or more items of event information that include at least a time of the first event and a geographic location of the first event. At step 920, the social-networking system 160 may identify one or more second event listings including one or more items of event information that include at least a time and a geographic location placing the second event listing in the first bucket of the array or one of the buckets of the array adjacent to the first bucket. At step 930, the social-networking system 160 may compute, for each of the second event listings, a similarity score between the first event listing and the second event listing, wherein the similarity score is based on a comparison of the event information of the first event listing and the event information of the second event listing. At step 940, the social-networking system 160 may update each second event listing having a similarity score greater than a threshold score to include redirection information referencing the first event listing and identifying the second event listings as being in an event cluster with the first event listing.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for de-duplicating events on a social-networking system including the particular steps of the method of FIG. 9, this disclosure contemplates any suitable method for de-duplicating events on a social-networking system including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
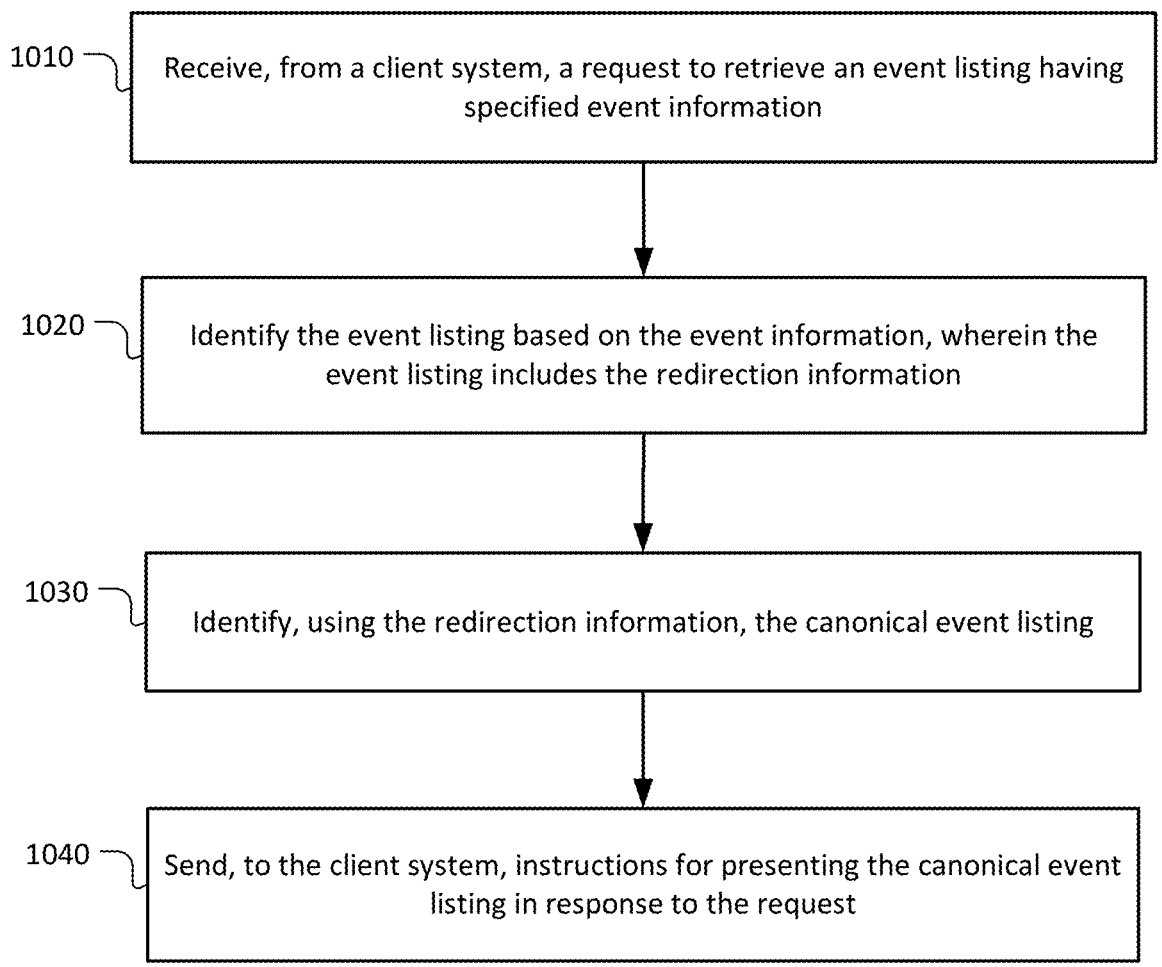
FIG. 10 illustrates an example method for retrieving canonical event listings on a social-networking system.

FIG. 10 illustrates an example method 1000 for retrieving canonical event listings on a social-networking system 160. The method may begin at step 1010, where the social-networking system 160 may receive, from a client system, a request to retrieve an event listing having specified event information. At step 1020, the social-networking system 160 may identify the event listing based on the event information, wherein the event listing includes the redirection information. At step 1030, the social-networking system 160 may identify, using the redirection information, the canonical event listing. At step 1040, the social-networking system 160 may send, to the client system, instructions for presenting the canonical event listing in response to the request.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for retrieving canonical event listings on a social-networking system including the particular steps of the method of FIG. 10, this disclosure contemplates any suitable method for retrieving canonical event listings on a social-networking system including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Automatic Detection of Events

In particular embodiments, a machine-learning model may be used to automatically categorize event listings 154 on a social-networking system 160. Event listings 154 may be associated with categories such as music (jazz, rap), comedy, sports (kickball, ultimate Frisbee), e-sports (League of Legends, HearthStone), and so on. Such event categories may be useful for search and discovery features on online social networks or other user applications, such as specific event-management applications. For example, a user may click or tap on a category name in an events application to view event listings 154 in that category. Event categories may be related to other event categories, so that related event listings 154 may be found by searching related categories. The event categories may be arranged in a hierarchy, with the broadest categories at the top of the hierarchy and the narrowest at the bottom. For example, "entertainment" may be a top-level category, "music" may be below entertainment, and "jazz" and "rap" may be below "music." Thus, by automatically categorizing event listings 154, the social-networking system 160 may allow users to more easily search for and browse event listings 156, and to find event listings 156 in related categories in the hierarchy.

Figure 11A:
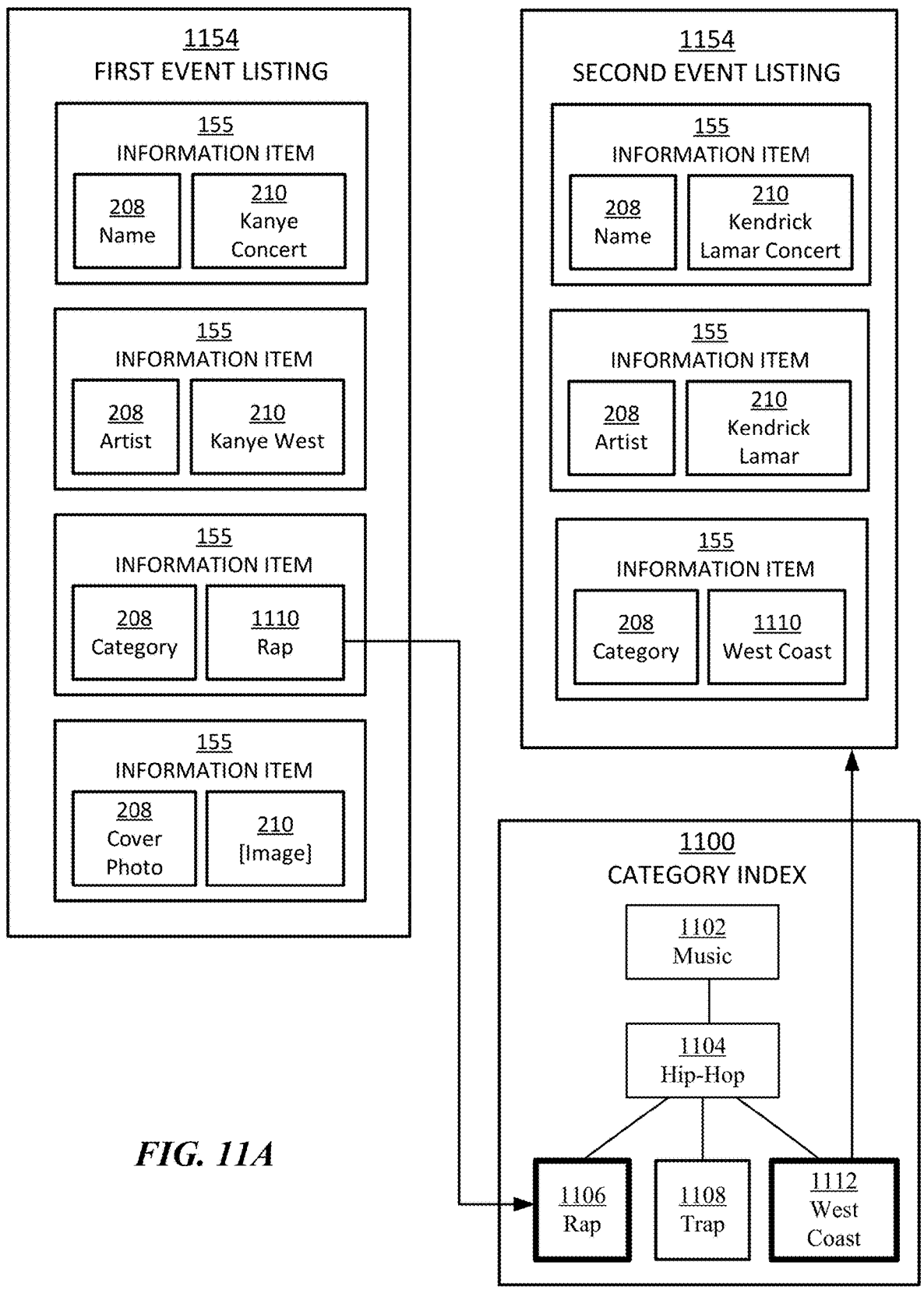
FIG. 11A illustrates an event recommendation example in which a first category associated with a first event listing is used to identify a second event listing having a second category related to the first category by a category index.

FIG. 11A illustrates an event recommendation example 1101 in which a category 1110 of an event listing 1154 may be used to identify a related category 1110 and event listings 1154 in the related category. In particular embodiments, event listings 1154 may correspond to the internal events 1154 or external events 1156 of FIG. 1, and may be associated with categories 1110 such as music 1102 (e.g., jazz, rap), comedy, sports (e.g., kickball, ultimate Frisbee), e-sports (e.g., League of Legends, HearthStone), and so on. Such event categories 1110 are useful for search and discovery features of user applications. For example, a user 101 may click or tap on a category name in an events application presented on a client system 130 to view event listings 1154 in that category 1110. Event categories 1110 may be related to other event categories 1110, so that related events may be found by searching related categories 1110. The event categories 1110 may be arranged in a hierarchy 1100, with the broadest categories 1110 at the top of the hierarchy and the narrowest categories 1110 at the bottom. As an example, "entertainment" (not shown) may be a top-level category, "music" 1102 may be below "entertainment," and "hip-hop" 1104 may be below "music" 1102. Thus, by automatically categorizing event listings 1154, the social-networking system 160 may allow users 101 to more easily search for and browse event listings 1154, and to find event listings 1154 in related or adjacent categories. Although users 101 may manually provide categories for events, for example, by typing in a description in a category-field when creating an event, or selecting a predetermined category from a drop-down menu, doing so can be inconvenient or, for large quantities of event listings 1154 such as those imported from a third-party system 170, impractical. In particular embodiments, a category 1110 may be associated with one or more event listings 1154 in a social-networking system 160 by a machine-learning model that has been trained to identify appropriate categories 1110 for event listings 1154. The machine-learning model may be, e.g., a deep neural network or other suitable type of model.

In particular embodiments, the social-networking system 160 may receive one or more event listings 154 corresponding to one or more real-world events. The event listings 154 may be received from, for example, an external event system such as a third-party system 170, a user 101 of the online social network, e.g., via a user interface of a client system 130, a notification on the social networking system 160, a message on the social networking system 160, or a list of search results generated by, e.g., the social-networking system 160, the third-party system 170, or the server system 180. For each of the received event listings 154, the social-networking system 160 may identify, using a machine-learning model, one or more categories 1110 for the event listing 154 based on one or more items of information 155 included in the event listing 154, and associate the identified categories 1110 with the event listing 154. The identified categories may be selected from the plurality of categories in the hierarchy 1100. The hierarchy 1100 may also be referred to herein as a hierarchical category index 1100.

In particular embodiments, the machine-learning model may map one or more items of event information 155 in an event listing 1154 to each category 1110 associated with the event listing 1154. The items of event information 155 may include text content, which may be provided to the machine-learning model as input. As described with reference to FIG. 1, the event listing 1154 may represent a real-world event, and the text content may include a title 210 of the event, a time 210 of the event, a geographic location 210 of the event, an entity 230 associated with the event, a description of the event, or other value 210 of an item 155 of event information. The items of event information 155 may include a graphical image and/or a hash or embedding computed based on the graphical image. The hash or embedding may be provided to the machine-learning model as input.

In particular embodiments, a social-networking system 160 may receive, from a first client system 130 of a first user 101 of the social-networking system 160, a search query for event listings 1154 that are to be identified. The search query may specify one or more criteria for identifying event listings 1154. For example, the criteria may include an event category 1110, a value of an information item 155 associated with an event listing 1154, such as the name of an artist or location, a type of event, or other appropriate values of information items 155. In particular embodiments, one or more categories 1110 may be associated with an event listing 1154. As an example and not by way of limitation, the categories 1110 associated with an event listing 1154 may be stored in the event listing 1154 as items of event information 155 having a name "Category" 208 and a value 1110 that specifies the name of the category. Although this disclosure describes associating categories 1110 with an event listing 1154 in a particular manner, this disclosure contemplates associating categories 1110 with an event listing 1154 in any suitable manner.

In particular embodiments, the categories 1110 associated with an event listing 1154 may be selected from a set of categories 1110 in a hierarchical category index 1100 that includes one or more top-level categories, e.g., "music" 1102, and one or more lower-level categories below the top-level categories. The lower-level categories in the example of FIG. 11A include "hip-hop" 1104, "rap" 1106, "trap" 1108, and "west coast" 1112. Each category 1110 associated with a first event listing 1154 may be determined using a machine-learning model that analyzes one or more of the items of event information 155 provided by a creator of the first event listing 1155. The machine-learning model may categorize an event listing 1154 by analyzing content associated with the event listing 1154, such as the items 155 of information, e.g., the title and description of the event listing 154, and applying one or more category labels to the event. The category labels may be, e.g., names or identifiers of categories 1110, and may be applied by, e.g., associating them with the event listing 154. The category labels may be selected from a set of category labels associated with Wikipedia topics, which have been manually mapped into a category hierarchy. There may be numerous labels in the set, e.g., thousands of labels. The machine-learning model may also use computer-vision features from the cover photo image associated with the event. A hash or an embedding may be computed for an image and compared to hashes/ embeddings for other images, such that if two hashes/embeddings are similar, then the corresponding two images are similar. The hash or embedding may be used as an input feature for the machine-learning model. In one example, this image feature showed a 10% average improvement in precision across all categories in a hierarchy. More information on hashes and embedding may be found in U.S. patent application Ser. No. 15/289,532, filed 10 Oct. 2016, and U.S. patent application Ser. No. 15/847,451, filed 19 Dec. 2017, each of which is incorporated by reference herein.

The machine-learning model used for event categorization may be a deep-text model, which may perform convolutions over word embeddings. The model may implement a sequence-modeling system that takes an input as a series of symbols and maps the input to a class. Words may be mapped to data, for example. The machine-learning model may be trained using events for which human users have provided categories.

In particular embodiments, similarity scores may be calculated for graphical images, such as event cover photos or other images associated with event listings 154, using transfer learning. An image segmentation system may extract features from images and produce a hash value based on the extracted features. The hash value may have, e.g., 255 Boolean values. When comparing hash values, if most of the Boolean values are the same, then the images tend to be similar. If most of the values are different, the images tend to be quite different semantically and content-wise. The hash from an event's image may be used as an input to the model, which may learn and generalize based on similarity between labeled data (e.g., labeled cover photos) and unlabeled data. For example, music concerts often have artists that are shown in event cover photos. A cover photo showing music artists may be more likely to be a music event according to the model. The image model need not be trained specifically for this purpose. Instead, the image model may trained for another purpose, and then the output of that trained image model may be used as input to this model. That ensemble may be trained specifically on manually-labeled events data. The model may be trained on images of events, where the events have been trained by human trainers. For example, an event may have an associated category of soccer, and a photo associated with the event is known to be associated with soccer for training purposes.

In particular embodiments, the social-networking system 160 may identify one or more first event listings 1154 that match the query. Each first event listing 1154 may include one or more items of event information 155 associated with a respective first event 1154. A first event listing 1154 may match the query if, e.g., one or more items of event information 155 associated with the first event listing 1154 are the same as one or more of the query criteria. As an example, the query "Kanye" has the value "Kanye" as query criteria. The "Kanye" query may match the first event listing 1154 because the "Name" information item 155 has the value "Kanye Concert" 210, which contains the query criteria "Kanye." The "Kanye" query may also match the first event listing 1154 because the "Artist" information item 155 has the value "Kanye West" 210, which matches the criteria "Kanye." The second event listing 1154 does not have any information items 155 containing the query criteria "Kanye" and so does not match the query "Kanye." Queries may also include criteria specifying a value for a particular information item. For example, the query "Artist=Kanye" may match the first event listing 1154 because the first event listing 1154 includes the information item 155 "Artist=Kanye West." A query may match multiple event listings 1154. For example, the query "Concert" may match both the first event listing 1154 an the second event listing 1154 because both event listings 1154 include information items 155 having values that include the string "Concert" and both the first and second event listings 1154 may be included in search results for the query "Concert."

In particular embodiments, the social-networking system 160 may identify one or more second event listings 1154 based on the first event listing 1154. In particular embodiments, the first event listing 1154 may be identified or received from a source such as an external event system 170, a user 101 of the social-networking system 160, a notification on the social-networking system 160, a message on the social-networking system, a list of search results, or the like. In the example of FIG. 4, the first event listing 1154 includes four information items 155: a name ("Kanye Concert"), an artist ("Kanye West"), a category ("Rap" 1110), and a cover photo (an image 210, e.g., an image of the artist). The second event listing 1154 includes three information items 155: a name ("Kendrick Lamar Concert"), an artist ("Kendrick Lamar"), and a category ("West Coast" 1110). The hierarchical category index 1100 has a "Music" category 1102, which has a more-specific child category "Hip-Hop" 1104, which in turn has three more-specific child categories: "Rap" 1106, "Trap" 1108, and "West Coast" 1112.

In particular embodiments, each second event listing 1154 may be associated with a predetermined category from an adjacent category of the one or more predetermined categories in the hierarchical category index 1100. For example, a first category 1110 associated with a first event listing 1154 may be used to identify a second event listing 1154 having a second category 1110. The second category 1110 may related to the first category 1110 by a category index 1100, and the second event listing 1154 may be identified by using the category index 1100 to map the first category 1110 to the second category 1110. Event listings 1154 having the second category may be identified and used as the second event listings 1154. In particular embodiments, to identify the second event listings 1154 related to the first event listing 1154, the social-networking system 160 may select a category 1110 of the first event listing 1154, then, using the hierarchical category index 1100, identify one or more second event listings 1154 having either (a) the same category 1110 as the first event listing 1154 or (b) a "second" category 1112 related to the category 1110 of the first event listing 1154. In particular embodiments, the same category 1110 may be selected when there are one or more second event listings 1154 having the same category 1110 as the first event listing. If there are no such second event listings 1154, or each such second event listing 1154 has already been identified in response to a previous request, then the second category 1112 related to the category of the first event listing 1154 may be selected, and a second event listing 1154 having the second category 1112 may be identified.

As an example and not by way of limitation, upon receiving a first event listing 1154 ("Kanye Concert") having a category 1110 ("Rap"), to identify a second event listing 1154 for use in a recommendation, the social-networking system 160 may search the event listings (e.g., in the data store 164) for another event 1154 listing having the same category 1110 ("Rap"). To identify an additional second event listing 1154 in a different category to recommend, or if there are no second event listings having the same category 1110, the social-networking system 160 may select a category node 1106 ("Rap") in the category index 1100 having the same category 1110 as the first event listing 1154, then select an adjacent category node, e.g., node 1108

("Trap") or 1112 ("West Coast"), and search the event listings (e.g., in the data store 164) for a second event listing 1154 having the adjacent category. If the adjacent category node 1112 ("West Coast") is selected, then the search may identify a second event listing 1154 ("Kendrick Lamar Concert") having the same category 1110 ("West Coast") as the adjacent category node 1112. The second event listing 1154 may then be identified as a result, e.g., for recommendation to a user 101.

In particular embodiments, to select one or more second categories 1110 that are related to a given category (such as those of the first event listing 1154), the social-networking system 160 may find a category node in the hierarchical category index 1100 reachable via a path from the node that corresponds to the given category. Thus, a second category related to a given category may be a category adjacent to the given category (e.g., a sibling of the given category) in the category index 100. That is, an adjacent category may be a sub-category of a parent category of a given predetermined category. The second category related to a given category may alternatively be a parent or child of the given category, or a sibling of a parent or child of the given category, or a parent or child of a sibling of the given category. The terms "parent" and "child" as used herein ordinarily refer to a first-degree parent or child, though greater degrees are possible (e.g., the second category may be a grandparent (a second-degree parent) or a grandchild (a second-degree child)).

Referring to FIG. 11A, as introduced above, to identify the related category 1112, the social-networking system 160 may search the category index 1100 for a node corresponding to the first category 1110. Upon finding a first node 1106 corresponding to the first category 1110 in the category index 1100, the social-networking system 160 may traverse the category index 1100 from the first node 1106 to identify a node corresponding to the related category 1112. The traversal may identify a node having a predetermined relationship to the first node 1106 of the first category 1110, such as being adjacent to the first node 11106. For example, the traversal may identify an adjacent category node 1112 ("West Coast") or 1108 ("Trap"). The choice between multiple adjacent nodes may be made randomly or based on criteria such as selecting the closest node. Further, when there are multiple possible choices, e.g., multiple adjacent nodes, each subsequent request may be provided with a different node as a response, until all of the possible choices have been selected in different subsequent responses, at which point the cycle may begin again, possibly in a different order. For example, if there are multiple adjacent nodes from which to choose, the closest node not previously returned may be selected for each response, in which case, when selecting nodes adjacent to node 1106 ("Rap), the closest adjacent node 1108 ("Trap") may be selected in response to a first request, the next-closest node 1112 ("West Coast") may be selected in response to a second request, and so on.

Figure 11B:
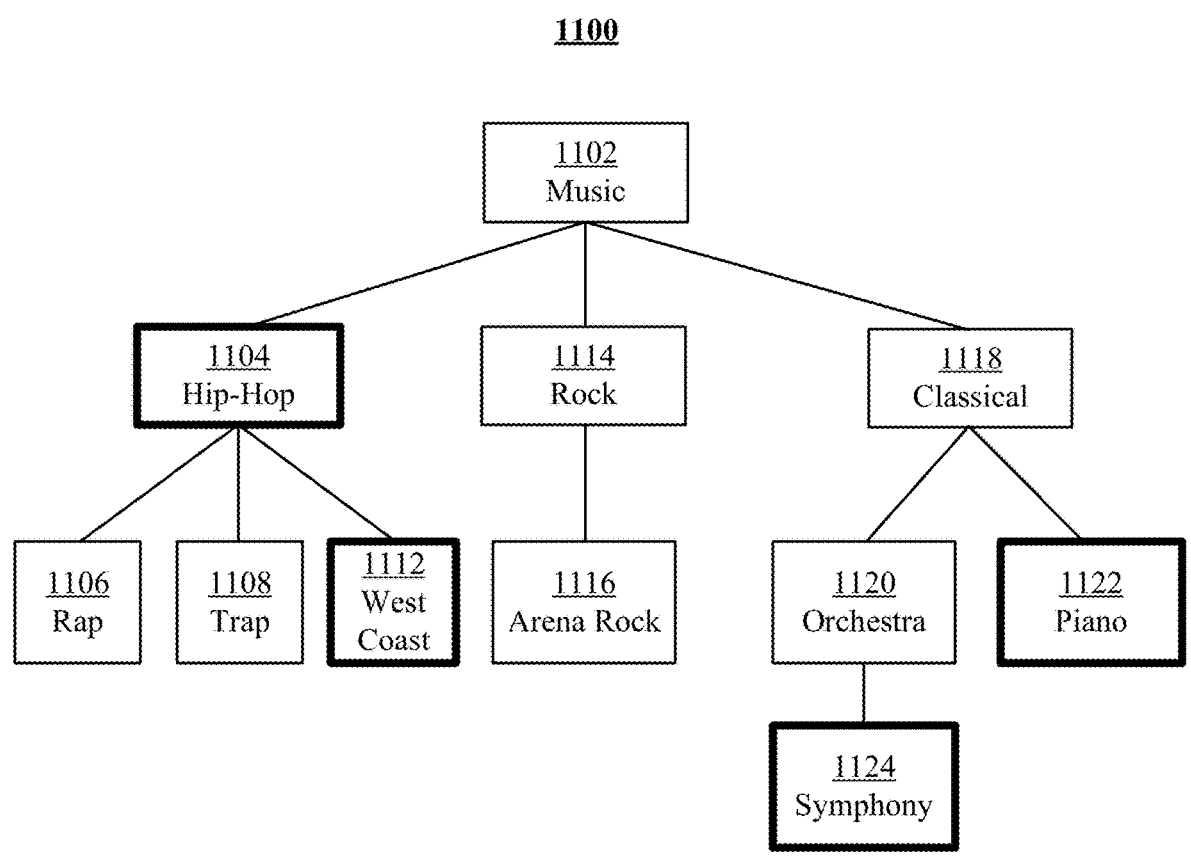
FIG. 11B illustrates an example hierarchical category index.

FIG. 11B illustrates an example hierarchical category index 1100, in which nodes correspond to categories. The hierarchical category index 1100 includes a "Music" category 1102, which is the top-level category illustrated in FIG. 11B. There may be one or more parent categories of "Music" 1102, e.g., an "Entertainment" category (not shown) or the like. The "Music" category 1102 has three children: a "Hip-Hop" category 1104, a "Rock" category 1114, and a "Classical" category 1118. In particular embodiments, categories that are direct (e.g., first-degree) children of the same node may be referred to herein as adjacent categories. Thus, "Hip-Hop" 1104, "Rock" 1114, and "Classical" 1118 may be considered adjacent categories. The "Hip-Hop" category 1104 has three children: A "Rap" category 1106, a "Trap" category 1108, and a "West Coast" category 1112, which may be considered adjacent categories. The "Rock" category 1114 has one child, which is an "Arena Rock" category 1116. In particular embodiments, "Arena Rock" 1116 is not considered adjacent to "West Coast" 1112 because the two categories do not have a common first-degree parent category. The "Classical" category 1118 has two children: an "Orchestra" category 1120 and a Piano category 1122. The "Orchestra" category 1120 has one child, a "Symphony" category 1124. In particular embodiments, the hierarchical category index 1100 may be constructed manually, e.g., by initially analyzing labeled data and category co-occurrence. A clustering analysis may then be performed based on category assignment by determining which two categories are together more often (i.e., co-occurring event labels), and using the resulting tree to build the hierarchy. For example, users 101 may label the leaves, and a natural order may be derived from the labeled leaves.

In particular embodiments, as introduced above, the hierarchical category index 1100 may be used to identify event listings 1154 that are related to a given event listing 1154. Given an event listing, related event listings may be identified by identifying a category 1112 related to the category 1110 of the event listing, then identifying second event listings 1154 having the related category 1112. As an example, for "a Kanye Concert" event listing 1154, the category of the event listing 154 may be identified by an information item 155 of the event listing 154, e.g., by an information item 155 having the value "Rap" 1110. Alternatively, the category of the event listing 154 may be identified based on information items 155 such as the artist name 210 or the event listing name 210, instead of or in addition to the category information item 155. As an example, if an event listing 154 includes an information item Artist="Kanye West," then a category 1110 associated with "Kanye West" may be identified, e.g., from a database or in-memory table that associates artists with music genres, or by performing a web search for the artist name and extracting a category from the search results. The determined category may be "Rap," for example, if the search results mention "Rap". The hierarchical category index 1100 may then be used to identify a category related to "Rap," e.g., by identifying the "Rap" node 1104 in the index 1100 and selecting one of the child nodes of the "Rap" node 1104, such as "West Coast" 1112, as a related category 1112.

In particular embodiments, on an events user interface page, if a user selects, e.g., taps on, a category, such as Rap 1106, then a search and discovery user interface may present events from one or more genres of music that are related to the selected category (e.g., West Coast 1112 and Hip-Hop 1104). If there are not enough event listings in the selected category, then related categories such as adjacent categories may be identified. The related categories may be selected as described above, and/or based on relevance to the user, e.g., based on relevance of the categories to the user's past interactions with the events user interface, or whether one or more of the user's friends are going to (e.g., registered to attend) an event associated with the category.

In particular embodiments, related categories 1110 may be identified by traversing up the hierarchical category index 1100 and assigning weights proportionally to the levels. For example, lower levels may be assigned higher weights, and the weight of each successively higher level may be lower than the level below. The operation of retrieving the related categories may be performed by a distributed system, in which the retrieval may be biased so that the retrieval is more likely to retrieve elements from a first category, slightly less likely, to retrieve from a second category, and even less likely to retrieve from a third category. The first category may be the highest-weighted, the second category may have lower weight than the first, and the third category may have lower weight than the second. As an example and not by way of limitation, a query for Rap artists may be configured to retrieve an event listing with 100% probability if the listing's event category is Rap 1106, to retrieve an event listing with 50% probability if the listing's category is Hip-Hop 1104, and to retrieve the listing with 20% probability if the listing's category is Music 1102. In particular embodiments, the siblings of the queried category ("Rap" 1106), e.g., "Trap" 1108 and "West Coast" 1112, may be assigned the same retrieval probability as the level above the queried category ("Hip-hop" 1104). For example, a different child category of Hip-Hop 1104, e.g., Trap or West Coast, may be retrieved with 50% probability.

In particular embodiments, the social-networking system 130 may send, to the first client system 130 responsive to a search query, instructions for presenting a search-results interface comprising references to one or more of the first event listings 1154 and one or more of the second event listings 1154. Search query results may be sent to the client system 130, and the search query results may include an event listing 154 or a reference to an event listing 154. The reference to the event listing 154 may include a link with a snippet (e.g., the title of the event and a thumbnail cover photo), which may be selectable in a user interface on the client system 130 to cause presentation (e.g., display) on the client system 130 of an event-interface that contains the event listing 154. As an example and not by way of limitation, each of the references may include an event identifier for the referenced event listing 1154, a link to the referenced event listing 1154, and/or a photo associated with the referenced event listing 1154.

Figure 12:
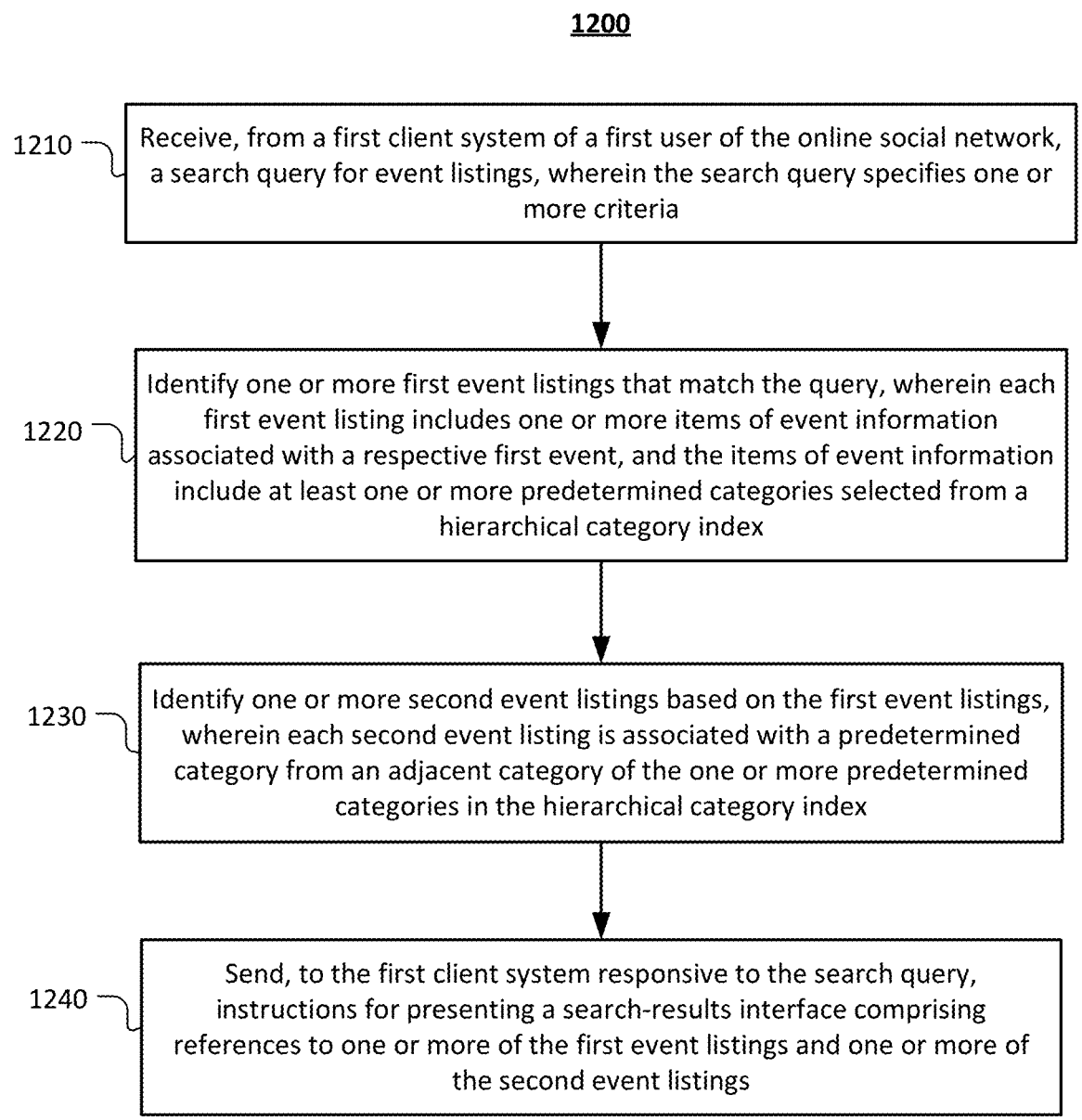
FIG. 12 illustrates an example method for identifying event listings based on a search query and one or more event categories.

FIG. 12 illustrates an example method 1200 for identifying event listings based on a search query and one or more event categories. The method may begin at step 1210, where the social-networking system 160 may receive, from a first client system of a first user of the social-networking system 160, a search query for event listings, wherein the search query specifies one or more criteria. At step 1220, the social-networking system 160 may identify one or more first event listings that match the query, wherein each first event listing includes one or more items of event information associated with a respective first event, and the items of event information include at least one or more predetermined categories selected from a hierarchical category index. At step 1230, the social-networking system 160 may identify one or more second event listings based on the first event listings, wherein each second event listing is associated with a predetermined category from an adjacent category of the one or more predetermined categories in the hierarchical category index. At step 1240, the social-networking system 160 may send, to the first client system responsive to the search query, instructions for presenting a search-results interface comprising references to one or more of the first event listings and one or more of the second event listings.

Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for identifying event listings based on a search query and one or more event categories including the particular steps of the method of FIG. 12, this disclosure contemplates any suitable method for identifying event listings based on a search query and one or more event categories including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Social Graphs

Figure 13:
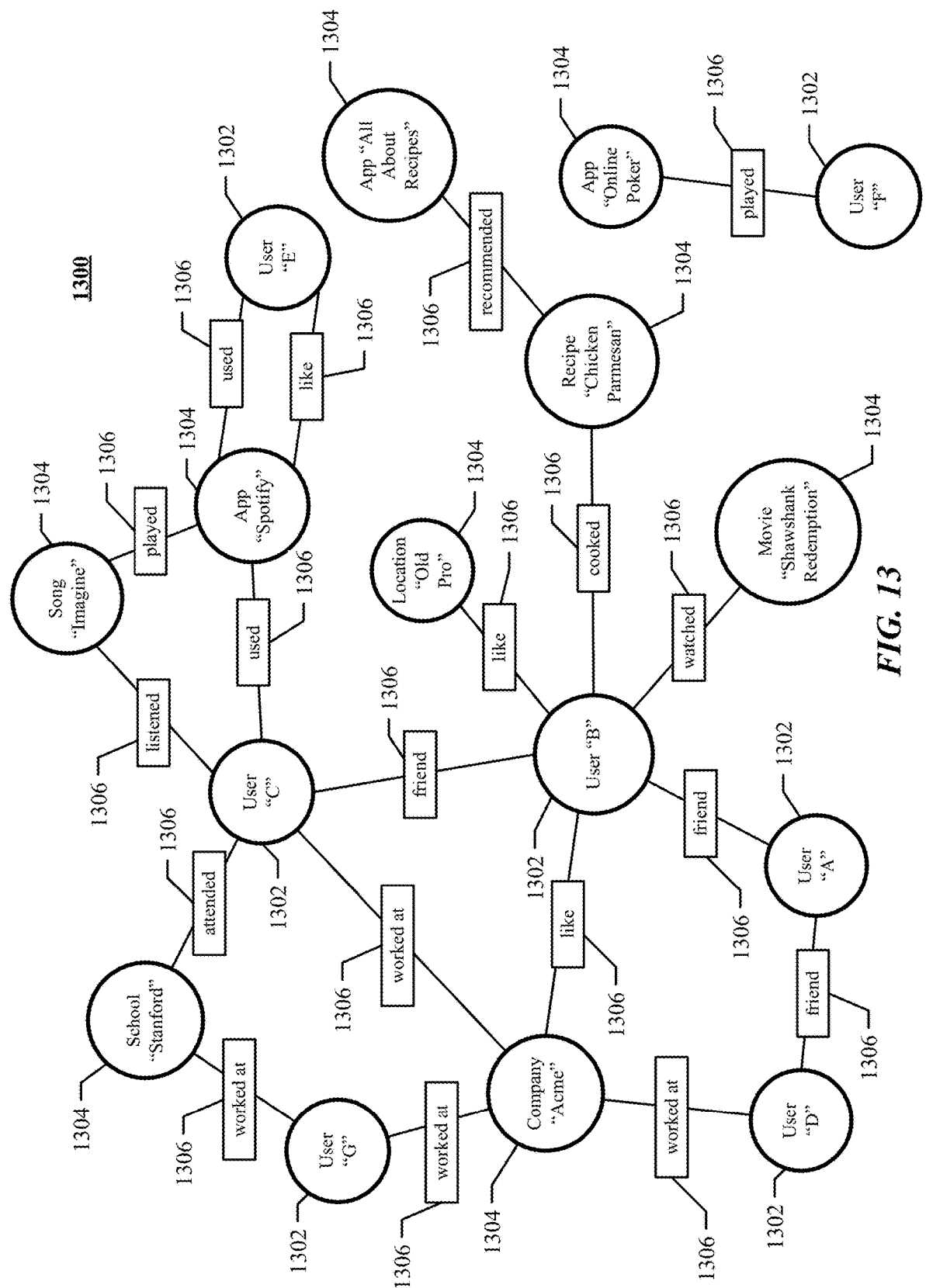
FIG. 13 illustrates an example social graph.

FIG. 13 illustrates example social graph 1300. In particular embodiments, social-networking system 160 may store one or more social graphs 1300 in one or more data stores. In particular embodiments, social graph 1300 may include multiple nodes—which may include multiple user nodes 1302 or multiple concept nodes 1304—and multiple edges 1306 connecting the nodes. Example social graph 1300 illustrated in FIG. 13 is shown, for didactic purposes, in a two-dimensional visual map representation. In particular embodiments, a social-networking system 160, client system 130, or third-party system 170 may access social graph 1300 and related social-graph information for suitable applications. The nodes and edges of social graph 1300 may be stored as data objects, for example, in a data store (such as a social-graph database). Such a data store may include one or more searchable or queryable indexes of nodes or edges of social graph 1300.

In particular embodiments, a user node 1302 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 1302 corresponding to the user, and store the user node 1302 in one or more data stores. Users and user nodes 1302 described herein may, where appropriate, refer to registered users and user nodes 1302 associated with registered users. In addition or as an alternative, users and user nodes 1302 described herein may, where appropriate, refer to users that have not registered with social-networking system 160. In particular embodiments, a user node 1302 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 1302 may be associated with one or more data objects corresponding to information associated with a user. In particular embodiments, a user node 1302 may correspond to one or more webpages.

In particular embodiments, a concept node 1304 may correspond to a concept. As an example and not by way of limitation, a concept may correspond to a place (such as, for example, a movie theater, restaurant, landmark, or city); a website (such as, for example, a website associated with social-networking system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 1304 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1304 may be associated with one or more data objects corresponding to information associated with concept node 1304. In particular embodiments, a concept node 1304 may correspond to one or more webpages.

In particular embodiments, a node in social graph 1300 may represent or be represented by a webpage (which may be referred to as a "profile page"). Profile pages may be hosted by or accessible to social-networking system 160. Profile pages may also be hosted on third-party websites associated with a third-party system 170. As an example and not by way of limitation, a profile page corresponding to a particular external webpage may be the particular external webpage and the profile page may correspond to a particular concept node 1304. Profile pages may be viewable by all or a selected subset of other users. As an example and not by way of limitation, a user node 1302 may have a corresponding user-profile page in which the corresponding user may add content, make declarations, or otherwise express himself or herself. As another example and not by way of limitation, a concept node 1304 may have a corresponding concept-profile page in which one or more users may add content, make declarations, or express themselves, particularly in relation to the concept corresponding to concept node 1304.

In particular embodiments, a concept node 1304 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 1302 corresponding to the user and a concept node 1304 corresponding to the third-party webpage or resource and store edge 1306 in one or more data stores.

In particular embodiments, a pair of nodes in social graph 1300 may be connected to each other by one or more edges 1306. An edge 1306 connecting a pair of nodes may represent a relationship between the pair of nodes. In particular embodiments, an edge 1306 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 1306 connecting the first user's user node 1302 to the second user's user node 1302 in social graph 1300 and store edge 1306 as social-graph information in one or more of data stores 164. In the example of FIG. 13, social graph 1300 includes an edge 1306 indicating a friend relation between user nodes 1302 of user "A" and user "B" and an edge indicating a friend relation between user nodes 1302 of user "C" and user "B." Although this disclosure describes or illustrates particular edges 1306 with particular attributes connecting particular user nodes 1302, this disclosure contemplates any suitable edges 1306 with any suitable attributes connecting user nodes 1302. As an example and not by way of limitation, an edge 1306 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1300 by one or more edges 1306.

In particular embodiments, an edge 1306 between a user node 1302 and a concept node 1304 may represent a particular action or activity performed by a user associated with user node 1302 toward a concept associated with a concept node 1304. As an example and not by way of limitation, as illustrated in FIG. 13, a user may "like," "attended," "played," "listened," "cooked," "worked at," or "watched" a concept, each of which may correspond to an edge type or subtype. A concept-profile page corresponding to a concept node 1304 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 1306 and a "used" edge (as illustrated in FIG. 13) between user nodes 1302 corresponding to the user and concept nodes 1304 corresponding to the song and application to indicate that the user listened to the song and used the application. Moreover, social-networking system 160 may create a "played" edge 1306 (as illustrated in FIG. 13) between concept nodes 1304 corresponding to the song and the application to indicate that the particular song was played by the particular application. In this case, "played" edge 1306 corresponds to an action performed by an external application (SPOTIFY) on an external audio file (the song "Imagine"). Although this disclosure describes particular edges 1306 with particular attributes connecting user nodes 1302 and concept nodes 1304, this disclosure contemplates any suitable edges 1306 with any suitable attributes connecting user nodes 1302 and concept nodes 1304. Moreover, although this disclosure describes edges between a user node 1302 and a concept node 1304 representing a single relationship, this disclosure contemplates edges between a user node 1302 and a concept node 1304 representing one or more relationships. As an example and not by way of limitation, an edge 1306 may represent both that a user likes and has used at a particular concept. Alternatively, another edge 1306 may represent each type of relationship (or multiples of a single relationship) between a user node 1302 and a concept node 1304 (as illustrated in FIG. 13 between user node 1302 for user "E" and concept node 1304 for "SPOTIFY").

In particular embodiments, social-networking system 160 may create an edge 1306 between a user node 1302 and a concept node 1304 in social graph 1300. As an example and not by way of limitation, a user viewing a concept-profile page (such as, for example, by using a web browser or a special-purpose application hosted by the user's client system 130) may indicate that he or she likes the concept represented by the concept node 1304 by clicking or selecting a "Like" icon, which may cause the user's client system 130 to send to social-networking system 160 a message indicating the user's liking of the concept associated with the concept-profile page. In response to the message, social-networking system 160 may create an edge 1306 between user node 1302 associated with the user and concept node 1304, as illustrated by "like" edge 1306 between the user and concept node 1304. In particular embodiments, social-networking system 160 may store an edge 1306 in one or more data stores. In particular embodiments, an edge 1306 may be automatically formed by social-networking system 160 in response to a particular user action. As an example and not by way of limitation, if a first user uploads a picture, watches a movie, or listens to a song, an edge 1306 may be formed between user node 1302 corresponding to the first user and concept nodes 1304 corresponding to those concepts. Although this disclosure describes forming particular edges 1306 in particular manners, this disclosure contemplates forming any suitable edges 1306 in any suitable manner.

Systems and Methods

Figure 14:
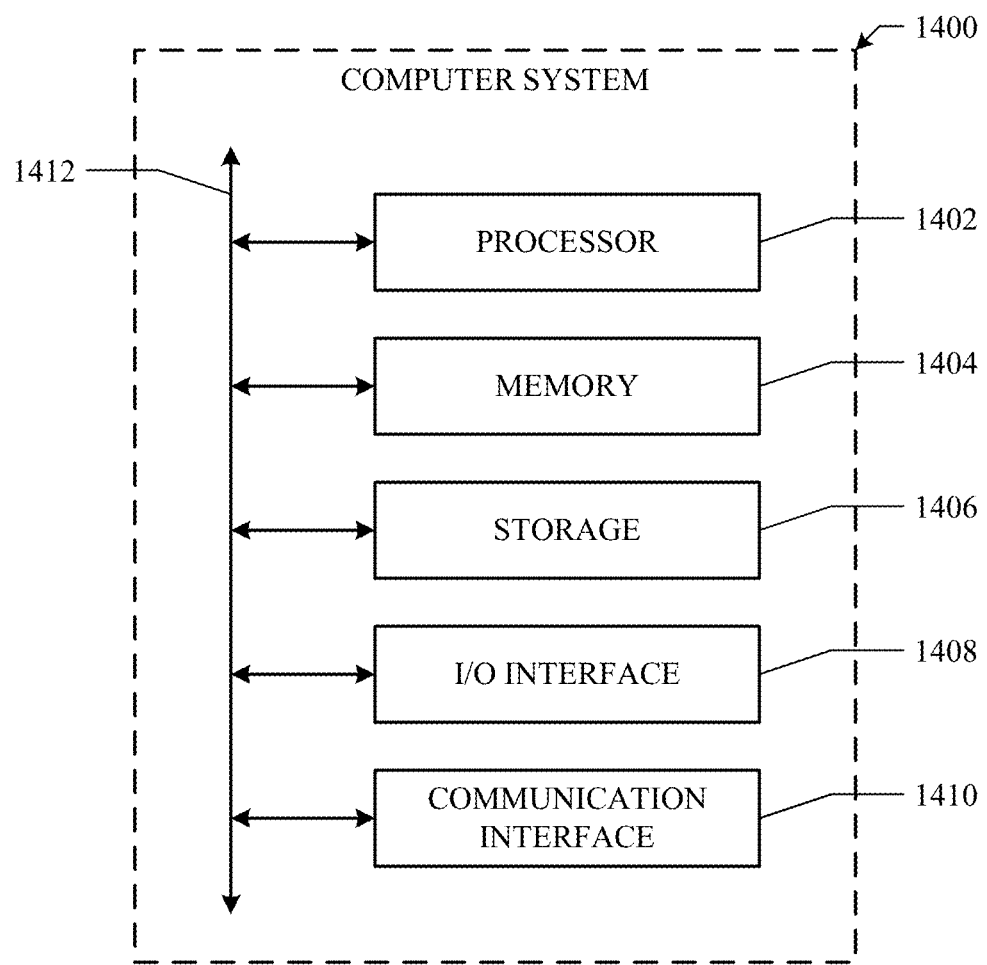
FIG. 14 illustrates an example computer system.

FIG. 14 illustrates an example computer system 1400. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it. As an example and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate.

Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems of an online social network:
    receiving, at the one or more computing systems, a first event listing corresponding to a first event, wherein the first event listing comprises one or more items of event information associated with the first event, wherein the items of event information include at least a time of the first event and a geographic location of the first event;
    bucketizing, by the one or more computing systems, the first event listing based on the time of the event and the location of the event, wherein the first event listing is placed in a first bucket of an array, wherein a first dimension of the array corresponds to time increments, and wherein a second dimension of the array corresponds to geographic map tiles, and wherein the first bucket corresponds to the time increment including the time of the first event and the geographic map tile including the geographic location of the first event;
    identifying, by the one or more computing systems, one or more second event listings corresponding to one or more second events, respectively, wherein each second event listing comprises one or more items of event information associated with the respective second event, wherein the items of event information include at least a time of the respective second event and a geographic location of the respective second event, wherein each second event listing has a time and geographic location placing each second event listing in the first bucket of the array or one of the buckets of the array adjacent to the first bucket;
    computing, by the one or more computing systems, for each of the second event listings, a similarity score between the first event listing and the second event listing, wherein the similarity score is based on a comparison of the event information of the first event listing and the event information of the second event listing; and
    updating, by the one or more computing systems, each second event listing having a similarity score greater than a threshold score to include redirection information to the first event listing to de-duplicate events on a social-networking system, wherein the redirection information identifies the second event listings as being in an event cluster with the first event listing, the redirection information further identifying a canonical event listing in the event cluster to which the other event listings in the cluster are redirected.

2. The method of claim 1, wherein the canonical event listing is identified using one or more rules based on one or more items of information of each event listing in the event cluster.

3. The method of claim 2, wherein at least one of the rules is based on whether the event listing in the event cluster is an official event listing or is received from a trusted event provider.

4. The method of claim 2, wherein at least one of the rules is based on whether a user that created the event listing in the event cluster is a verified user.

5. The method of claim 2, wherein at least one of the rules is based on how many users are registered to attend to the event associated with the event listing in the event cluster.

6. The method of claim 1, further comprising:
    sending, by the one or more computing systems, responsive to a request to access one of the event listings in the cluster, instructions for presenting an event-listing interface comprising a reference to the canonical event listing.

7. The method of claim 6, wherein the event-listing interface is part of a search-results interface.

8. The method of claim 7, wherein the event-listing interface further comprises references to the other event listings in the cluster, wherein the canonical event listing is presented at a higher rank than the other event listings in the cluster in the event-listing interface.

9. The method of claim 8, wherein the other event listings in the cluster are ranked according to the similarity scores of the other event listings with respect to the canonical event listing.

10. The method of claim 6, wherein the event-listing interface is part of a newsfeed interface.

11. The method of claim 1, wherein the similarity score for each of the second event listings is determined using a machine-learning model, wherein the machine-learning model:
  receives one or more feature vectors having one or more feature values including a first feature value based on the first event listing and a second feature value based on the second event listing; and
  computes the similarity score based on the first and second feature values.

12. The method of claim 11, wherein the feature values comprise a count of how many strings in the first event listing are the same as strings in the second event listing.

13. The method of claim 11, wherein the feature values comprise a difference in time between the start times of the first and second event listings.

14. The method of claim 11, wherein the feature values comprise a difference in distance between the locations of the first and second event listings.

15. The method of claim 1, wherein updating each second event listing having a similarity score greater than a threshold score to include redirection information to the first event listing comprises storing a reference to the first event listing in the canonical event listing.

16. The method of claim 15, further comprising:
  receiving, by the one or more computing systems, from a client system, a request to retrieve an event listing having specified event information;
  identifying, by the one or more computing systems, the event listing based on the event information, wherein the event listing includes the redirection information;
  identifying, by the one or more computing systems, using the redirection information, the canonical event listing; and
  sending, by the one or more computing systems, to the client system, instructions for presenting the canonical event listing in response to the request.

17. The method of claim 1, wherein the second event listings are received from one or more of:
  an external event system,
  a user of the online social network,
  a notification on the online social network,
  a message on the online social network, or
  a list of search results.

18. One or more computer-readable non-transitory storage media embodying software that is operable when executed to:
  receive a first event listing corresponding to a first event, wherein the first event listing comprises one or more items of event information associated with the first event, wherein the items of event information include at least a time of the first event and a geographic location of the first event;
  bucketize the first event listing based on the time of the event and the location of the event, wherein the first event listing is placed in a first bucket of an array, wherein a first dimension of the array corresponds to time increments, and wherein a second dimension of the array corresponds to geographic map tiles, and wherein the first bucket corresponds to the time increment including the time of the first event and the geographic map tile including the geographic location of the first event;
  identify one or more second event listings corresponding to one or more second events, respectively, wherein each second event listing comprises one or more items of event information associated with the respective second event, wherein the items of event information include at least a time of the respective second event and a geographic location of the respective second event, wherein each second event listing has a time and geographic location placing each second event listing in the first bucket of the array or one of the buckets of the array adjacent to the first bucket;
  compute for each of the second event listings, a similarity score between the first event listing and the second event listing, wherein the similarity score is based on a comparison of the event information of the first event listing and the event information of the second event listing; and
  update each second event listing having a similarity score greater than a threshold score to include redirection information to the first event listing to de-duplicate events on a social-networking system, wherein the redirection information identifies the second event listings as being in an event cluster with the first event listing, the redirection information further identifying a canonical event listing in the event cluster to which the other event listings in the cluster are redirected.

19. A system comprising: one or more processors; and a non-transitory memory coupled to the processors comprising instructions executable by the processors, the processors operable when executing the instructions to:
  receive a first event listing corresponding to a first event, wherein the first event listing comprises one or more items of event information associated with the first event, wherein the items of event information include at least a time of the first event and a geographic location of the first event;
  bucketize the first event listing based on the time of the event and the location of the event, wherein the first event listing is placed in a first bucket of an array, wherein a first dimension of the array corresponds to time increments, and wherein a second dimension of the array corresponds to geographic map tiles, and wherein the first bucket corresponds to the time increment including the time of the first event and the geographic map tile including the geographic location of the first event;
  identify one or more second event listings corresponding to one or more second events, respectively, wherein each second event listing comprises one or more items of event information associated with the respective second event, wherein the items of event information include at least a time of the respective second event and a geographic location of the respective second event, wherein each second event listing has a time and geographic location placing each second event listing in the first bucket of the array or one of the buckets of the array adjacent to the first bucket;
  compute for each of the second event listings, a similarity score between the first event listing and the second event listing, wherein the similarity score is based on a comparison of the event information of the first event listing and the event information of the second event listing; and
  update each second event listing having a similarity score greater than a threshold score to include redirection information to the first event listing to de-duplicate events on a social-networking system, wherein the redirection information identifies the second event listings as being in an event cluster with the first event listing, the redirection information further identifying a canonical event listing in the event cluster to which the other event listings in the cluster are redirected.

\* \* \* \* \*